(12) United States Patent
Inaba et al.

(10) Patent No.: US 6,553,185 B1
(45) Date of Patent: Apr. 22, 2003

(54) OPTICAL APPARATUS

(75) Inventors: Hiroyoshi Inaba, Utsunomiya; Masae Miyakawa, Chigasaki; Tadanori Okada, Utsunomiya, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 09/614,005

(22) Filed: Jul. 11, 2000

(30) Foreign Application Priority Data

Jul. 16, 1999 (JP) .......................................... 11-203166
Dec. 28, 1999 (JP) .......................................... 11-372829
May 30, 2000 (JP) ...................................... 2000-160942

(51) Int. Cl.$^7$ .......................... G03B 17/00; G02B 7/04; G02B 15/14
(52) U.S. Cl. .......................... 396/85; 396/144; 359/676; 359/696; 359/699
(58) Field of Search .......................... 396/72, 85, 144, 396/379; 359/676, 694, 696, 699, 700

(56) References Cited

U.S. PATENT DOCUMENTS

| | | | |
|---|---|---|---|
| 5,083,146 A | 1/1992 | Ueda | 396/62 |
| 5,113,261 A | 5/1992 | Morisawa | 348/357 |
| 5,196,963 A | * 3/1993 | Sato et al. | 359/699 |
| 5,339,126 A | * 8/1994 | Shimose | 396/85 |

OTHER PUBLICATIONS

Patent Abstract of Japan JP 11076295, published Mar. 16, 1999.

\* cited by examiner

*Primary Examiner*—David M. Gray
*Assistant Examiner*—Rochelle Blackman
(74) *Attorney, Agent, or Firm*—Robin, Blecker & Daley

(57) ABSTRACT

An optical apparatus, such as a lens barrel, includes a first unit holding member and a second unit holding member arranged to hold a first optical unit and a second optical unit, respectively, a driven member arranged to be driven to move in an optical axis direction, and a cam member of a plate-like shape having a cam part, the cam member being capable of taking a first state in which the cam member rotates around a predetermined axis, without moving in the optical axis direction, according to movement of the driven member in the optical axis direction, and a second state, different from the first state, in which the cam member moves in the optical axis direction according to movement of the driven member in the optical axis direction, wherein, when taking each of the first state and the second state, the cam member drives the first unit holding member and the second unit holding member in the optical axis direction. More specifically, a normal zooming function is performed in the first state. In the second state, the two optical units are drawn inward to bring the lens barrel into a standby state for photo-taking.

18 Claims, 13 Drawing Sheets

OPTICAL APPARATUS

BACKGROUND OF THE INVENTION

1. Field of the Invention

The present invention relates to an optical apparatus, such as a lens barrel, adapted for an image pickup apparatus, such as a video camera or the like.

2. Description of Related Art

Known zoom lenses for video cameras include such a zoom lens that is composed of four lens units including, for example, a fixed convex lens unit (having a positive refractive power), a movable concave lens unit (having a negative refractive power), a fixed convex lens unit (having a positive refractive power) and a movable convex lens unit (having a positive refractive power) arranged in this order from the side of an object of shooting.

FIGS. 6(a) and 6(b) show a popular lens barrel arrangement of a zoom lens of the above-stated four-lens-unit structure. FIG. 6(a) is a sectional view taken on a line A—A in FIG. 6(a).

Referring to FIGS. 6(a) and 6(b), the zoom lens is composed of four lens units, i.e., a front lens unit 201a arranged to be stationary, a variator lens unit 201b arranged to perform a magnification varying action by moving in the direction of an optical axis 205, an afocal lens unit 201c arranged to be stationary, and a focusing lens unit 201d arranged to keep a focal plane unvaried by the variation of magnification as well as to adjust focus by moving in the direction of the optical axis 205.

Guide bars 203, 204a and 204b are arranged in parallel with the optical axis 205 to guide and restrain the moving lens units from turning. A DC motor 206 is a drive source arranged to drive and move the variator lens unit 201b.

The front lens unit 201a is held by a front lens tube 202. The variator lens unit 201b is held by a V moving ring 211. The afocal lens unit 201c is held by an intermediate frame 215, and the focusing lens unit 201d is held by an RR moving ring 214.

The front lens tube 202 is positioned on and secured to a rear tube 216. By using these two tubes 202 and 216, the guide bar 203 is positioned and held by them while a guide screw shaft 208 is rotatably supported by these tubes 202 and 216. The guide screw shaft 208 is arranged to be driven to rotate with the rotation of the output shaft 206a of the DC motor 206 transmitted through a gear train 207.

The V moving ring 211 which holds the variator lens unit 201b is provided with a ball 210, which engages a pressing spring 209 and is caused by the force of the pressing spring 209 to engage a screw groove 208a formed in the guide screw shaft 208. The V moving ring 211 is thus arranged to move back and forth in the direction of the optical axis 205 while being guided and restricted from turning by the guide bar 203 when the guide screw shaft 208 is driven to rotate by the DC motor 206.

The guide bars 204a and 204b are fitted into and supported by the rear tube 216 and the intermediate frame 215 which is positioned on the rear tube 216. The RR moving ring 214 is arranged to be movable back and forth in the direction of the optical axis 250 while being guided and restrained from turning by the guide bars 204a and 204b.

The RR moving ring 214, which holds the focusing lens unit 201d, has sleeve parts into which the guide bars 204a and 204b are slidably fitted. A rack 213 is mounted on the RR moving ring 214 and is arranged to be integral with the RR moving ring 214 in the direction of the optical axis 250.

A stepping motor 212 is arranged to drive and rotate a lead screw 212a formed integrally with the output shaft thereof. The lead screw 212a engages the rack 213 which is mounted on the RR moving ring 214. When the lead screw 212a rotates, the RR moving ring 214 moves in the direction of the optical axis 250 while being guided by the guide bars 204a and 204b.

As for a drive source to be used for the variator lens unit 201b, a stepping motor may be used similarly to the drive source for the focusing lens unit 201d.

A lens barrel body in which the lens units, etc., are housed in an approximately sealed state is formed by the front lens tube 202, the intermediate frame 215 and the rear tube 216.

In a case where the lens unit holding frames are arranged to be moved by means of stepping motors, the absolute position of each holding frame is detected by counting driving pulses applied to the stepping motor after the holding frame is detected to be at a reference position in the direction of the optical axis by means of a photo-interrupter or the like.

FIG. 7 shows the electrical arrangement of a camera body in a conventional image pickup apparatus. In FIG. 7, the components of the lens barrel described above with reference to FIGS. 6(a) and 6(a) are indicated by the same reference numerals as those used in FIGS. 6(a) and 6(a).

Referring to FIG. 7, a solid-state image sensor 221 is composed of a CCD or the like. A zoom driving mechanism 222 is arranged to drive the variator lens unit 201b and includes the motor (or a stepping motor) 206, the gear train 207 and the guide screw shaft 208, etc.

A focusing driving mechanism 223 is arranged to drive the focusing lens unit 201d and includes the stepping motor 212, the lead screw 212a, the rack 213, etc.

An iris driving mechanism 224 is arranged to drive an iris device 235 which is disposed between the variator lens unit 201b and the afocal lens unit 201c.

A zoom encoder 225 and a focus encoder 227 are arranged to detect the absolute positions of the variator lens unit 201b and the focusing lens unit 201d, respectively, in the direction of the optical axis. In a case where a DC motor is employed as a variator drive source as in the case of FIGS. 6(a) and 6(a), a potentiometer or a magnetic encoder is employed as the absolute position encoder. If a stepping motor is employed as the drive source, it is generally practiced to set the holding frame at a reference position and, after that, to continuously count the number of operation pulses applied to the stepping motor as mentioned above.

An iris encoder 226 is arranged to detect a relation between the rotating position of a rotor and that of a stator with a Hall element disposed within the iris driving mechanism 224 which includes a motor, etc.

A CPU 232 presides over control of the camera, i.e., the image pickup apparatus. A camera signal processing circuit 228 performs various signal processing actions such as amplifying and gamma correcting actions on a video signal, etc., outputted from the solid-state image sensor 221. A contrast signal (Y) included in the video signal thus processed is allowed to pass through an AE gate 229 and an AF gate 230. These gates 229 and 230 are arranged to set optimum signal take-out ranges within a whole image plane for deciding an exposure and focusing. In some cases, the take-out ranges are variable in size or are provided at a plurality portions of the image plane.

An AF signal processing circuit 231 is arranged to process an AF signal for AF (automatic focusing or focus adjustment). The AF signal processing circuit 231 forms one or a plurality of outputs relative to a high-frequency component of the video signal. The camera is provided with a zoom switch 233 and a zoom tracking memory 234. The zoom tracking memory 234 is arranged to store positions of the focusing lens unit 201d to be set according to object distances and positions of the variator lens unit 201b in performing a magnification varying action. A memory disposed within the CPU 232 may be used as the zoom tracking memory 234.

When the zoom switch 233 is operated by a user of the camera, the CPU 232 performs control in such a way as to keep the position of the variator lens unit 201b and that of the focusing lens unit 201d in a predetermined relation computed on the basis of information obtained from the zoom tracking memory 234. For this purpose, the zoom driving mechanism 222 and the focusing driving mechanism 223 are driven and controlled in such a way as to cause the current absolute position of the variator lens unit 201b in the direction of the optical axis as detected by the zoom encoder 225 to coincide with a computed position where the variator lens unit 201b is to be set, and-to cause the current absolute position of the focusing lens unit 201d in the direction of the optical axis as detected by the focus encoder 227 to coincide with a computed position where the focusing lens unit 201d is to be set.

In performing an automatic focusing (AF) action, the CPU 232 controls the focusing driving mechanism 223 in such a way as to cause the output of the AF signal processing circuit 231 to show a peak value.

Further, to obtain an apposite exposure, the CPU 232 controls the aperture diameter of the iris device 235 through the iris driving mechanism 224 in such a way as to cause the output of the iris encoder 226 to become a predetermined value with the average value of a Y signal output passing through the AE gate 229 set at the predetermined value.

During recent years, a reduction in size and diameter of photo-taking lenses has come to be desired. However, in this respect, a zoom lens of the optical type having four lens units arranged in the order of a fixed convex lens unit, a movable concave lens unit, a fixed convex lens unit and a movable convex lens unit, from the side of the object of shooting, has presented such a problem that the total length of a lens barrel holding the optical system inevitably becomes long, because the front lens unit is arranged to be stationary.

To solve this problem, therefore, a drawn-in (stowing) type lens barrel has been developed to draw in the front lens unit toward a camera body in stowing the lens barrel. For the same purpose, a front-lens-position-variable type zoom lens also has been developed to shorten the total length of the optical system at a wide-angle end position.

However, since a helicoid is used for the lens barrel structure of the draw-in type or the front-lens-position-variable type, these lens barrel structures become complex and large in size. In addition to this drawback, they increase the number of necessary parts to cause an increase in cost.

Further, in a case where the helicoid is not used, a driving action is performed with rack members formed at a lead screw and moving lens units. In that case, however, if an external force happens to be exerted on the front lens unit, the position of the front lens unit would come to deviate from a normal position to cause the so-called rack deviation. The rack deviation ruins information on the position of the front lens unit. Under such a condition, the control for maintaining an in-focus state by keeping the front lens unit and the focusing lens unit at desired distances from each other over the whole range of focal lengths becomes no longer possible. In order to recover the normal state of control, an action of verifying the initial positions of the front lens unit and the focusing lens unit must be first performed by restarting a power supply.

BRIEF SUMMARY OF THE INVENTION

It is an object of the invention to provide an optical apparatus, such as a lens barrel, which is capable of driving a moving unit to move within a usage area and also to a stowed position with a simple cam mechanism.

It is another object of the invention to provide a compact optical apparatus which is capable of preventing any rack deviation even in a case where an external force happens to be exerted on the front lens unit (leading lens unit) and is capable of securing an in-focus state after removal of such an external force.

To attain the above objects, in accordance with one aspect of the invention, there is provided an optical apparatus, which comprises a first unit holding member and a second unit holding member arranged to hold a first optical unit and a second optical unit, respectively, a driven member arranged to be driven to move in an optical axis direction, and a cam member of a plate-like shape having a cam part, the cam member being capable of taking a first state in which the cam member rotates around a predetermined axis, without moving in the optical axis direction, according to movement of the driven member in the optical axis direction, and a second state, different from the first state, in which the cam member moves in the optical axis direction according to movement of the driven member in the optical axis direction, wherein, when taking each of the first state and the second state, the cam member drives the first unit holding member and the second unit holding member in the optical axis direction.

The optical apparatus further comprises a first guide member arranged to guide the first unit holding member in the optical axis direction, a first urging member arranged to urge the first unit holding member to move toward an object side, a second guide member arranged to guide the second unit holding member in the optical axis direction, and a second urging member arranged to urge the second unit holding member to move toward the object side.

Then, the cam member is a cam lever having a first end surface cam part and a second end surface cam part. The first unit holding member engages the first end surface cam part against an urging force of the first urging member. The second unit holding member engages the second end surface cam part against an urging force of the second urging member.

The cam member is provided with a long slot and a curved slot which branches from the long slot, and at least one of two pin members extending from a fixed member is fitted into the long slot.

In a state where the other of the two pin members is also fitted into the long slot, the cam member moves in the optical axis direction along the long slot, and, in a state where the other of the two pin members is fitted into the curved slot, the cam member rotates.

Further, in the state where the other of the two pin members is fitted into the curved slot, the cam member rotates to drive the first unit holding member and the second unit holding member in the optical axis direction so as to effect a zooming function.

Further, in the state where the other of the two pin members is also fitted into the long slot, the cam member moves in the optical axis direction along the long slot to cause the first unit holding member and the second unit holding member to move in the optical axis direction in such a way as to bring the optical apparatus into a standby state for a photo-taking operation.

The driven member and the first unit holding member move integrally with each other in the optical axis direction, and the cam member is pivotally supported by the first unit holding member.

In the optical apparatus, the cam member is provided with a first long slot, and a pin provided on the second unit holding member is fitted into the first long slot.

The cam member is further provided with a second long slot, and a pin provided on a fixed member is fitted into the second long slot.

The second long slot has two rectilinear portions.

The first unit holding member holds a lens unit located at a position closest to an object side.

The optical apparatus is a lens barrel.

In accordance with another aspect of the invention, there is provided an optical apparatus, which comprises a first unit holding member and a second unit holding member arranged to hold a first optical unit and a second optical unit, respectively, a first guide member arranged to guide the first unit holding member in an optical axis direction, a second guide member arranged to guide the second unit holding member in the optical axis direction, an urging member arranged to urge the first unit holding member to move toward an object side, and a cam member of a plate-like shape having a first cam part formed as an end surface cam and a second cam part, the cam member being arranged to rotate around a predetermined axis, wherein the end surface cam of the first cam part engages the first unit holding member against an urging force of the urging member, and the second cam part engages the second unit holding member, and wherein the first unit holding member and the second unit holding member move in the optical axis direction according to rotation of the cam member.

In the optical apparatus, the second cam part is a long slot, the long slot engaging a pin provided on the second unit holding member.

The optical apparatus further comprises a driving unit arranged to drive the second unit holding member in the optical axis direction.

In the optical apparatus, the driving unit includes an axial member which longitudinally extends in the optical axis direction and is provided with a helical groove, and a motor member arranged to drive the axial member to rotate, and the second unit holding member is driven in the optical axis direction along the helical groove according to the axial member being rotated.

In the optical apparatus, the first optical unit is a lens unit located at a position closest to the object side.

These and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
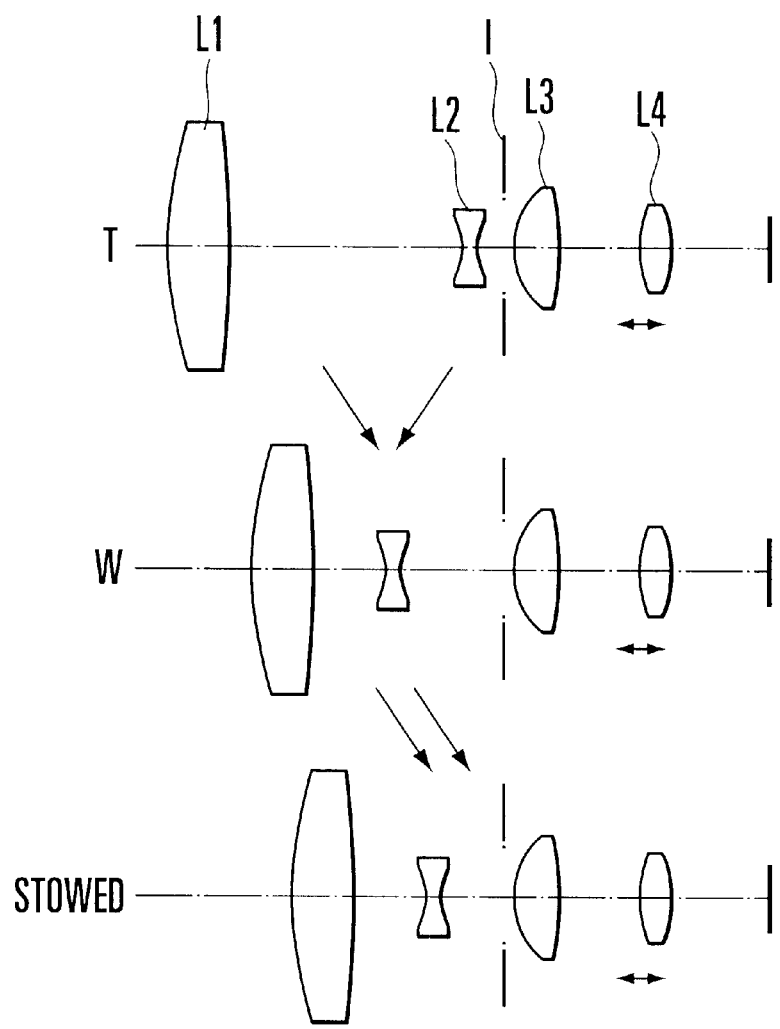
FIG. 1 shows the arrangement of an optical system adapted for a lens barrel according to a first embodiment of the invention.
Figure 2A:
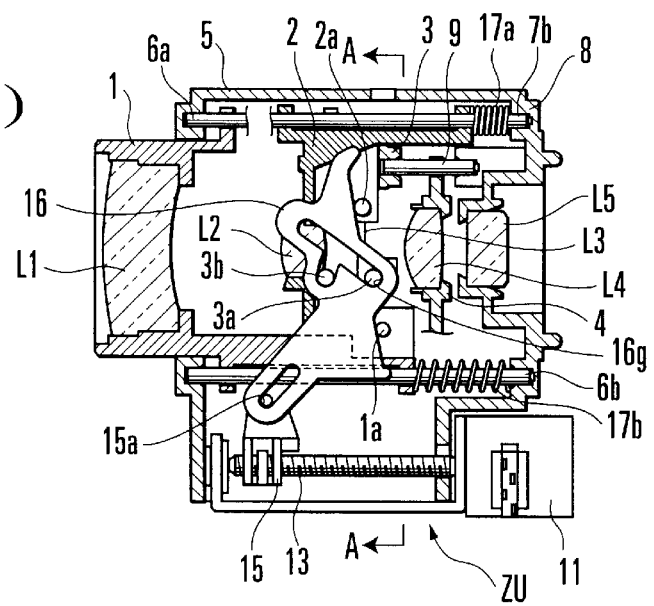
FIGS. 2(a) to 2(c) are sectional views showing the lens barrel having the optical system shown in FIG. 1, according to the first embodiment of the invention.
Figure 2B:
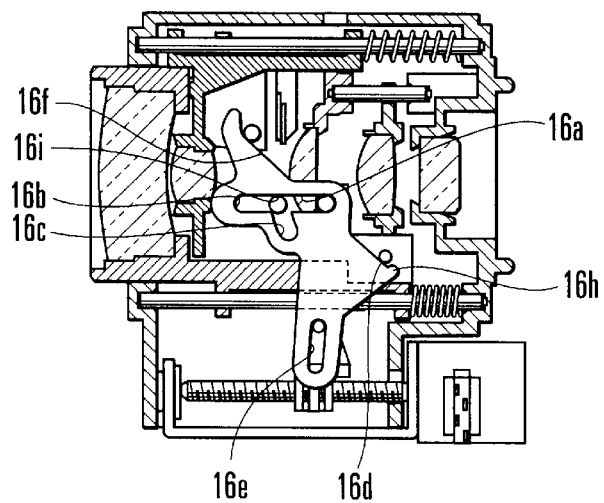
Figure 2C:
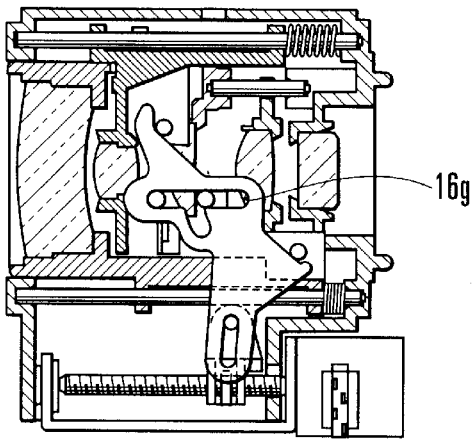
Figure 3:
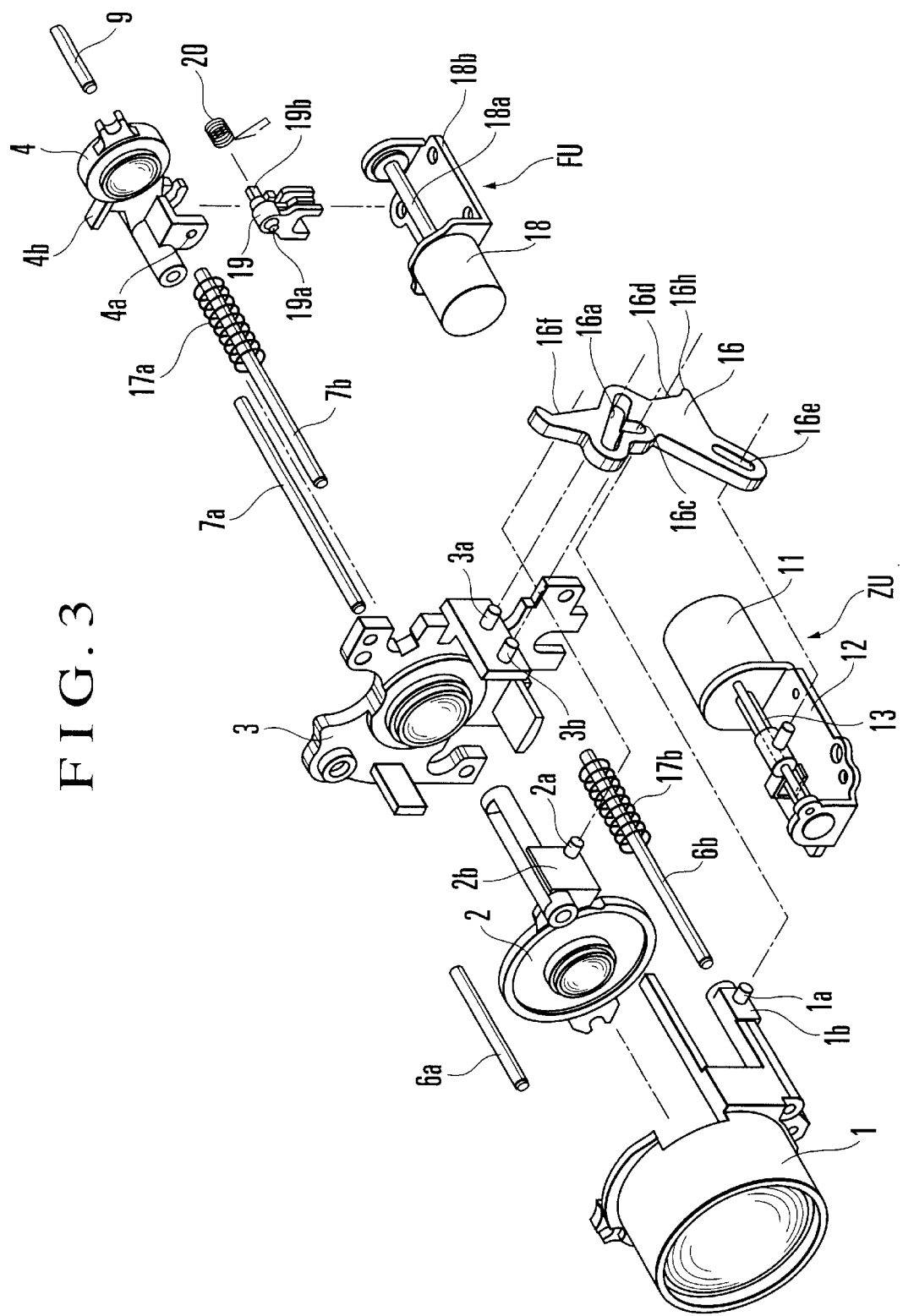
FIG. 3 is an exploded perspective view showing essential parts of a driving mechanism in the lens barrel shown in FIGS. 2(a) to 2(c).
Figure 4:
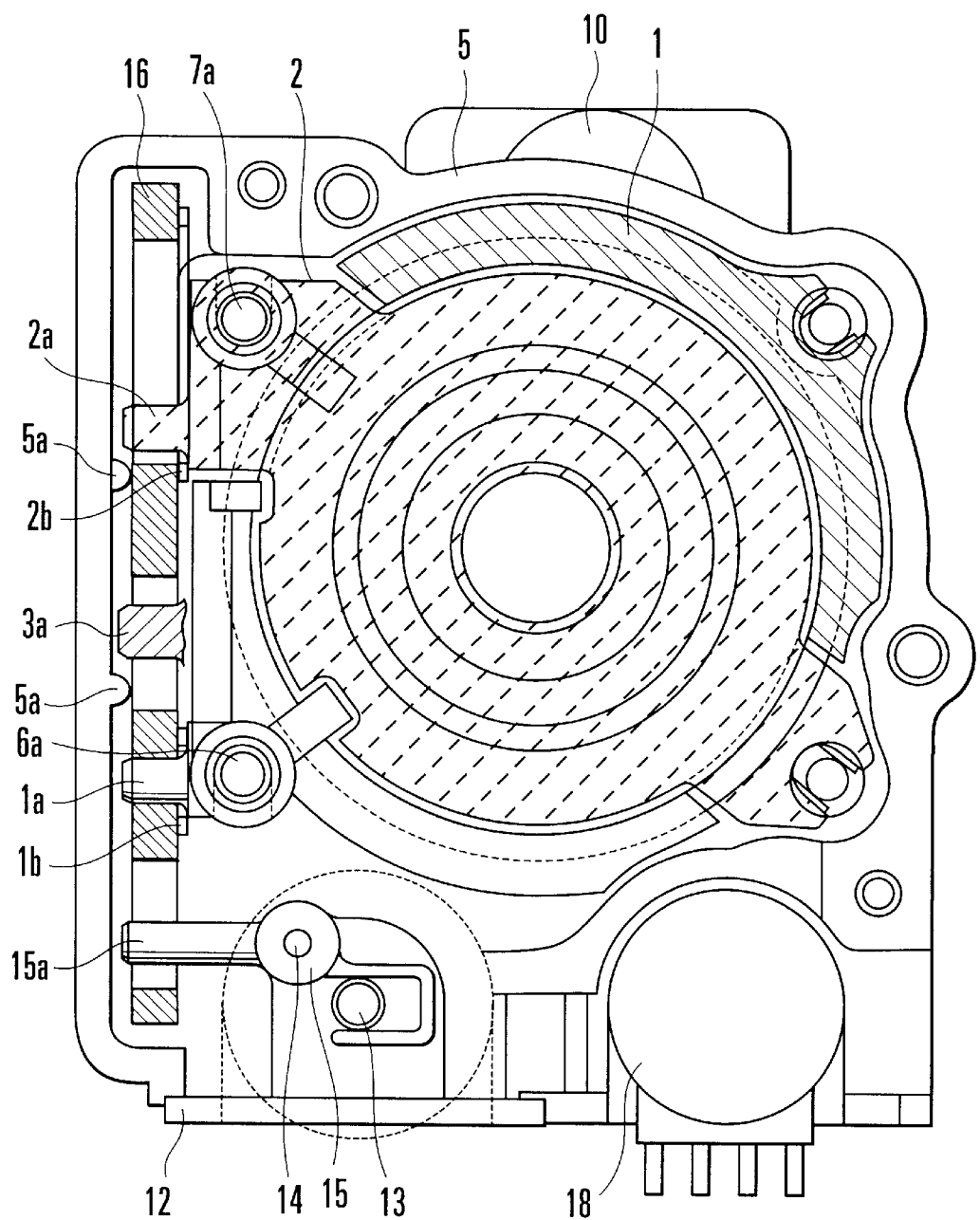
FIG. 4 is a sectional view of the lens barrel shown in FIGS. 2(a) to 2(c) taken on a line A—A shown in FIG. 2(a).
Figure 5:
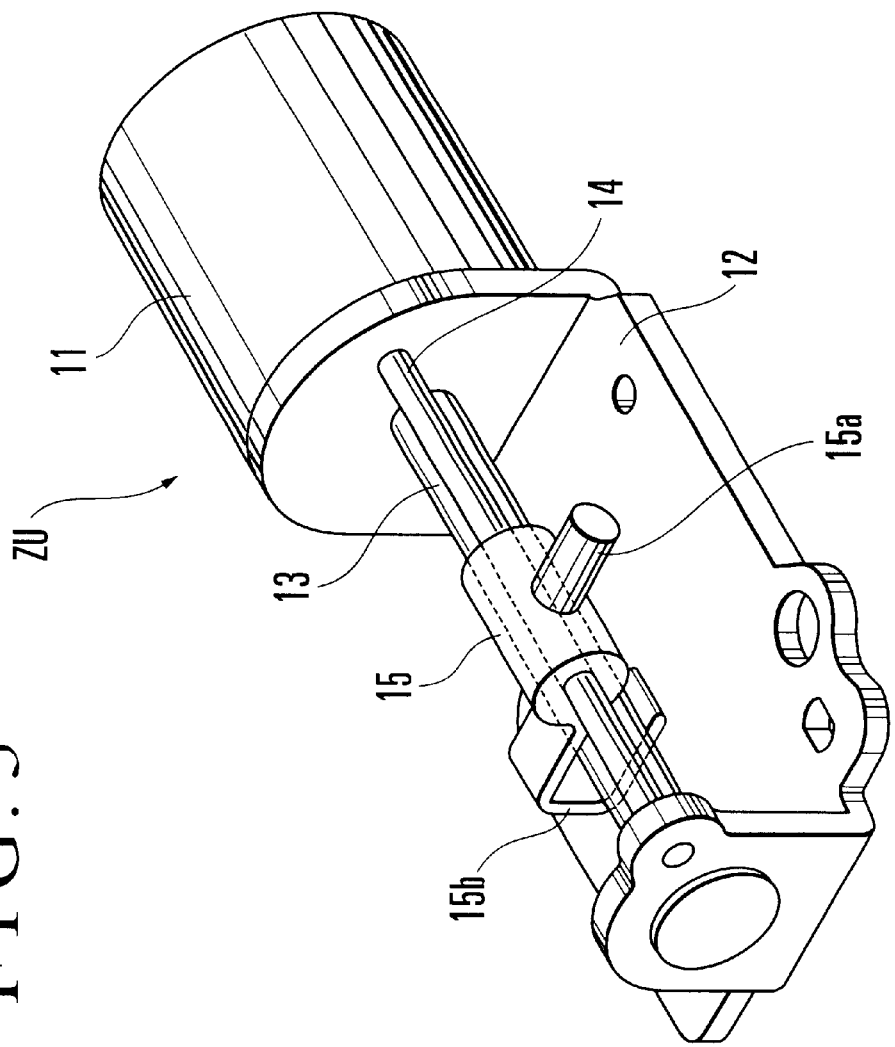
FIG. 5 is a perspective view showing a zoom motor unit used in the lens barrel shown in FIGS. 2(a) to 2(c).

FIG. 1 shows the arrangement of an optical system of a zoom lens barrel which is adapted for a video camera, according to a first embodiment of the invention. FIGS. 2(a) to 2(c) show in sectional views the arrangement of the lens barrel, i.e., an optical apparatus, in which the optical system shown in FIG. 1 is disposed. FIG. 3 shows a driving mechanism using a plate cam and arranged within the lens barrel. FIG. 4 is a sectional view of the lens barrel taken along a line A—A in FIG. 2(a). FIG. 5 shows the arrangement of a zoom motor unit used in the lens barrel.

Referring to FIG. 1, reference character L1 denotes a first lens unit having a positive refractive power, and reference character L2 denotes a second lens unit having a negative refractive power. During zooming, the first lens unit L1 and the second lens unit L2 are moved in opposite directions to perform a magnification varying action.

A third lens unit L3 is a fixed lens having a positive refractive power. A fourth lens unit L4 has a positive refractive power and is arranged to make focus adjustment. An iris unit I is provided for adjustment of the quantity of light. In FIG. 1, the optical system is shown at various positions in the order of, from above, a telephoto end position, a wide-angle end position and a drawn-in (stowed) position. As indicated by arrows, when zooming is made from the telephoto end position to the wide-angle end position, the first lens unit L1 moves toward the image side and the second lens unit L2 moves toward the object side. When no photo-taking operation is required, the optical system is moved to the drawn-in position. In this instance, both the first and second lens units L1 and L2 move toward the image side while keeping a spacing distance between them unvaried.

The arrangement for driving the optical system is next described. Referring to FIGS. 2(a) to 2(c), 3 and 4, a first-lens-unit tube 1 is arranged to hold and carry the first lens unit L1. The first-lens-unit tube 1 is carried by two guide bars 6a and 6b (see FIG. 3) in such a way as to be movable in the direction of the optical axis. A second-lens-unit tube 2 holds the second lens unit L2 and is arranged to be carried by two guide bars 7a and 7b (see FIG. 3) in such a way as to be movable also in the direction of the optical axis.

An afocal-lens tube 3 holds the third lens unit L3. The afocal-lens tube 3 is interposed in between a fixed tube 5 and a rear tube 8 which carries a low-pass filter L5, and is secured in position by means of screws (not shown).

In the rear of the rear tube 8, there is mounted a CCD sensor (not shown). A fourth-lens-unit tube 4 holds the fourth lens unit L4. The fourth-lens-unit tube 4 is carried by the guide bar 7b in common with the second-lens-unit tube 2 and also by a guide bar 9 in such a way as to be movable in the direction of the optical axis, The guide bars 6a, 6b, 7a and 7b are held on their both ends by the fixed tube 5 and the rear tube 8. The guide bar 9 is held by the afocal-lens tube 3 and the rear tube 8 on its both ends. These five guide bars are arranged to guide the motions in the direction of the optical axis of the first-lens-unit tube 1, the second-lens-unit tube 2 and the fourth-lens-unit tube 4 and also to prevent them from turning around the guide bars.

An IG meter 10 (see FIG. 4) is provided for driving iris blades with an electromagnetic actuator and is secured with screws (not shown) to the afocal-lens tube 3 which is interposed in between the fixed tube 5 and the rear tube 8. The body of the lens barrel is formed jointly by the fixed tube 5, the rear tube 8 and the afocal-lens tube 3.

A zoom motor unit (driving unit) ZU is composed of a zoom motor 11 which is a stepping motor employed as a drive source and a screw shaft 13 which is arranged integrally with the output shaft of the zoom motor 11. The zoom motor 11 and the screw shaft 13 are held by an approximately-U-shaped holding plate 12, as shown in FIG. 5. The zoom motor unit ZU is secured to the fixed tube 5 with screws.

A guide shaft 14 is mounted between the two ends of the holding plate 12 to extend in parallel with the screw shaft 13. A carriage 15 is fitted on the guide shaft 14 in such a way as to be axially movable.

The carriage 15 has a rack part 15b arranged to be in mesh with the screw shaft 13. When the screw shaft 13 is caused to rotate by the zoom motor 11, the carriage 15 is driven in the direction of the optical axis by a feeding screw action performed jointly by the screw shaft 13 and the rack part 15b. The carriage 15 further has a connection pin 15a arranged thereon to engage a connecting long slot 16e formed in a plate cam 16, which is to be described later. The plate cam 16 is thus arranged to receive from the zoom motor unit ZU a driving force in the direction of the optical axis through the carriage 15.

The first-lens-unit tube 1 has a cam follower 1a formed thereon to abut on a first cam part 16d of the plate cam 16. The first-lens-unit tube 1 is thus arranged to be driven in the direction of the optical axis when the abutting position of the cam follower 1a on the first cam part 16d is caused to vary by the rotation of the plate cam 16. The second-lens-unit tube 2 likewise has a cam follower 2a arranged to abut on a second cam part 16f of the plate cam 16. The second-lens-unit tube 2 is thus arranged to be driven in the direction of the optical axis when the abutting position of the cam follower 2a on the second cam part 16f is caused to vary by the rotation of the plate cam 16.

A focus motor unit FU (see FIG. 3) is composed of a focus motor 18 which is a stepping motor and a screw shaft 18a which is arranged integrally with the output shaft of the focus motor 18. The focus motor 18 and the screw shaft 18a are held by an approximately-U-shaped holding plate 18b. The focus motor unit FU is secured to the rear tube 8 with screws.

A rack 19 which is in mesh with the screw shaft 18a is mounted on the fourth-lens-unit tube 4. When the screw shaft 18a is caused to rotate by the focus motor 18, the screw shaft 18a and the rack 19 jointly perform a feeding screw action to drive the fourth-lens-unit tube 4 in the direction of the optical axis.

The rack 19 is urged by a spring 20 to move in the direction of meshing with the screw shaft 18a and to be pushed against the fourth-lens-unit tube 4 in the direction of the optical axis. The spring 20 is thus arranged to prevent the rack 19 from rattling in mesh with the screw shaft 18a and the thrust rattling against the fourth-lens-unit tube 4.

The rack 19 is mounted on the fourth-lens-unit tube 4 by fitting its shaft parts 19a and 19b into a hole part 4a formed in the fourth-lens-unit tube 4 to extend in the direction of the optical axis. The rack 19 is thus arranged to be rotatable on the shaft parts 19a and 19b in a direction orthogonally intersecting the optical axis. Therefore, even if the guide bars 7b and 9, which guide the fourth-lens-unit tube 4 in the direction of the optical axis, deviate from the screw shaft 18a in parallelism, the fourth-lens-unit tube 4 can be smoothly driven in the direction of the optical axis.

The plate cam 16 has the first and second cam parts 16d and 16f and the connecting long slot 16e formed in a flat plate, as mentioned above. In the plate cam 16, a guide slot is also formed in a part between the first and second cam parts 16d and 16f. The guide slot is composed of a rectilinear long slot part 16a and an arcuate slot part 16c which branches from an intermediate point of the rectilinear long slot part 16a. A first fixed pin 3a and a second fixed pin 3b which are provided on the afocal-lens tube 3 integrally therewith engage the guide slot (the long slot part 16a and the arcuate slot part 16c).

If the plate cam 16 receives, from the carriage 15, a driving force in the direction of the optical axis when the first fixed pin 3a abuts on an image-side end 16g of the long slot part 16a and the second fixed pin 3b engages the arcuate slot part 16c, as shown in FIG. 2(a), the plate cam 16 rotates around the first fixed pin 3a while being guided by the second fixed pin 3b. The rotatable range of the plate cam 16 is restricted with the second fixed pin 3b coming to abut on a fore end of the arcuate slot part 16c and on a width-side end 16i of the long slot part 16a.

Further, if the plate cam 16 receives the driving force of the carriage 15 in the direction of the optical axis when both the first and second fixed pins 3a and 3b are engaging the long slot part 16a, as shown in FIGS. 2(b) and 2(c), the plate cam 16 moves in the direction of the optical axis while being guided by the two fixed pins 3a and 3b. The movable range of the plate cam 16 in the direction of the optical axis is restricted with the first fixed pin 3a coming to abut on the image-side end 16g of the long slot part 16a and the second fixed pin 3b coming to abut on an object-side end 16b of the long slot part 16a.

The plate cam 16 is prevented from moving inward in the direction of diameter of the lens barrel, by a slide surface 1b formed at a root part of the pin 1a of the first-lens-unit tube 1 and a slide surface 2b formed at a root part of the pin 2a of the second-lens-unit tube 2.

Further, as shown in FIG. 4, with the fixed tube 5 mounted after mounting the plate cam 16, the plate cam 16 slidably abuts on two protruding parts 5a formed on the inner circumferential surface of the fixed tube 5, so that the plate cam 16 is prevented from moving outward in the direction of diameter of the lens barrel. A clearance which is large enough to permit the plate cam 16 either to smoothly rotate or to smoothly move in the direction of the optical axis is provided between the protruding parts 5a and the slide surfaces 1b and 2b.

The first-lens-unit tube 1 and the second-lens-unit tube 2 are urged toward the object side from the image side respectively by coiled springs 17b and 17a which are disposed on the outer circumferential sides of the guide bars 6b and 7b. The cam followers 1a and 2a of the first and second-lens-unit tubes 1 and 2 are pushed against the first and second cam parts 16d and 16f of the plate cam 16, respectively. Under this condition, the first and second-lens-unit tubes 1 and 2 are urged to move toward the front. The use of the coiled springs 17b and 17a eliminates abutting rattling between the cam followers 1a and 2a and the first and second cam parts 16d and 16f of the plate cam 16, and also eliminates abutting rattling between the first fixed pin 3a and the image-side end 16g of the long slot part 16a during a shift of the lens barrel from the wide-angle end position to the telephoto end position. Further, the coiled springs 17b and 17a are set to have spring pressure large enough for lifting up the first and second-lens-unit tubes 1 and 2 against their own weights so that the possibility of having the above-stated abutting rattling can be eliminated in whatever posture the lens barrel may be.

The operations of the lens barrel according to the first embodiment of the invention to be performed in a zoom area (usage area) and in a drawn-in area (stowed area) are next described.

To bring the lens barrel from the telephoto end position to the wide-angle end position, the zoom motor unit ZU is operated (in a first work area) to cause the carriage 15 to be moved from a position shown in FIG. 2(a) to a position shown in FIG. 2(b). Then, a driving force is exerted on the plate cam 16 through the carriage 15 for moving the plate cam 16 toward the image side in the direction of the optical axis. At this time, however, since the first fixed pin 3a is abutting on the image-side end 16g of the long slot part 16a and the second fixed pin 3b is engaging the arcuate slot part 16c, the cam plate 16 rotates counterclockwise around the first fixed pin 3a while being guided by the second fixed pin 3b.

The rotation of the plate cam 16 causes the cam follower 1a of the first-lens-unit tube 1, which is being urged by the coiled spring 17b toward the object side, to change its abutting position onto the cam part 16d of the plate cam 16. As a result, the first-lens-unit tube 1 moves toward the image side. Further, the cam follower 2a of the second-lens-unit tube 2, which is being urged by the coiled spring 17a toward the object side, is caused to change its abutting position onto the cam part 16f of the plate cam 16. The second-lens-unit tube 2 is thus caused to move in a direction reverse to the moving direction of the first-lens-unit tube 1, i.e., toward the object side.

When the lens barrel thus reaches the wide-angle end position, the second fixed pin 3b abuts on the width-side end 16i of the long slot part 16a of the plate cam 16 to prevent the plate cam 16 from rotating further counterclockwise. At this time, the long slot part 16a of the plate cam 16 is approximately in parallel with the optical axis.

When the zoom motor unit ZU is further operated in the same direction for moving the carriage 15 from the position shown in FIG. 2(b) to a position shown in FIG. 2(c) (in a second work are), a driving force toward the image side is exerted through the carriage 15 on the plate cam 16. Then, the plate cam 16, which is now prevented from rotating by the second fixed pin 3b, moves toward the image side together with the carriage 15 while being guided along the long slot part 16a by the first and second fixed pins 3a and 3b.

With the plate cam 16 thus moved toward the image side, the first and second-lens-unit tubes 1 and 2 are driven to move toward the image side together with the plate cam 16 against the urging forces of the coiled springs 17b and 17a while keeping a distance between the first and second-lens-unit tubes 1 and 2 obtained at the wide-angle end position. When the second fixed pin 3b comes to abut on the object-side end 16b of the long slot part 16a, the cam plate 16 is prevented from moving toward the image side any further, so that the lens barrel reaches the drawn-in end position. With the lens barrel in the drawn-in end position, the first-lens-unit tube 1 is stowed in such a way as to be not protruding from the lens barrel body.

On the other hand, when the zoom motor unit ZU is operated in the reverse direction (operation in the second work area) for driving the lens barrel from the drawn-in end position to the wide-angle end position, the plate cam 16 and the first and second-lens-unit tubes 1 and 2 are drawn out together toward the object side. Then, when the first fixed pin 3a comes to abut on the image-side end 16g of the long slot part 16a, the further movement of the plate cam 16 and the first and second-lens-unit tubes 1 and 2 toward the object side is prevented, so that the lens barrel is set at the wide-angle end position there.

Further, if the carriage 15 is moved from the position shown in FIG. 2(b) to the position shown in FIG. 2(a) by allowing the zoom motor unit ZU to further act in the reverse direction, the plate cam 16, which is now prevented by the first fixed pin 3a from moving in parallel from the position obtained at the wide-angle end position toward the object side, comes to rotate around the first fixed pin 3a. Then, the first-lens-unit tube 1, which is urged to move toward the object side by the coiled spring 17b, is caused to move toward the object side with the cam follower 1a changing its abutting position on the cam part 16d of the plate cam 16. Further, the second-lens-unit tube 2, which is urged toward the object side by the coiled spring 17b, is caused to move in the direction reverse to the moving direction of the first-lens-unit tube 1, i.e., toward the image side, as the abutting position of the cam follower 2a on the cam part 16f of the plate cam 16 changes.

When the plate cam 16 is either in the state shown in FIG. 2(b) or in the state shown in FIG. 2(c), a light-blocking part 16h formed in the neighborhood of the fore end of the first cam part 16d of the plate cam 16 comes in between the light-projecting element and light-receiving element of a photo-interrupter (not shown) which is secured to the lens barrel body. By this arrangement, the arrival at a reference position of the plate cam 16 is detected. After that, the position of the plate cam 16 can be detected by counting the number of pulses applied to the zoom motor 11. Since the positions of the first and second-lens-unit tubes 1 and 2 are interlocked with the plate cam 16, both the zooming position and the drawn-in position of the lens barrel can be detected by detecting the position of the plate cam 16.

The fourth-lens-unit tube 4 is provided also with a light-blocking part 4a. The arrival at a reference position of the fourth-lens-unit tube 4 is detectable by detecting that the light-blocking part 4a comes in between the light-projecting element and light-receiving element of a photo-interrupter (not shown). After detection of the arrival at the reference position, the position of the fourth-lens-unit tube 4 is detectable by counting the number of pulses applied to the focus motor 14.

As described above, according to the first embodiment, the plate cam 16 is singly and simply arranged to be capable of permitting complex driving actions in the same manner as in the case of using a cam ring. The plate cam 16 permits driving the two moving group elements in the direction of the optical axis by imparting to them the driving force of the zoom motor unit ZU in the direction of the optical axis. In zooming, the plate cam 16 causes the first and second-lens-unit tubes 1 and 2 to move in opposite directions. When the position of the lens barrel is in the drawn-in area, the first and second-lens-unit tubes 1 and 2 are moved in the same direction with a distance between them approximately kept constant.

Further, when the lens barrel is at the drawn-in position, the first-lens-unit tube 1 is stowed inside of the lens barrel. The total length of the lens barrel at the drawn-in position is thus effectively shortened, so that the portability thereof can be enhanced.

Besides, compared with the use of a cam ring or a helicoid ring, the arrangement of the first embodiment facilitates reduction in size of the lens barrel. In addition to this advantage, the arrangement permits also reduction in power consumption as it lessens a load torque on the zoom motor 11. Further, since the plate cam 16 is singly used, the lens barrel can be easily assembled and thus permits reduction in cost.

In the first embodiment, when an external force happens to act on the first-lens-unit tube 1 from the object side, the first-lens-unit tube 1 moves toward the image side against the urging force of the coiled spring 17b. At that time, the cam follower 1a of the first-lens-unit tube 1 parts from the first cam part 16d of the plate cam 16. Therefore, the external force is transmitted to none of the plate cam 16, the carriage 15 and the zoom motor unit ZU. At the carriage 15, the intermeshing position of the rack part 15b with the screw shaft 13 is thus never caused to deviate by any external force exerted on the first-lens-unit tube 1.

When the external force or the like ceases to act on the first-lens-unit tube 1, the urging force of the coiled spring 17b pushes the first-lens-unit tube 1 back toward the object side. The cam follower 1a of the first-lens-unit tube 1 again abuts on the first cam part 16d of the plate cam 16. After the removable of the external force, therefore, this arrangement ensures adequate optical performance of the lens barrel.

In the first embodiment, the stepping motor is used as a drive source. However, the same advantageous effects as those of the first embodiment can be obtained by using some other drive sources, such as a DC motor, a linear actuator or the like, in place of the stepping motor. Further, in the first embodiment, an optical detecting means, i.e., a photo-interrupter, is used for detecting positions. However, the use of the optical detecting means may be replaced with some other detecting means, such as magnetic or variable-resistance type detecting means.

In the case of the first embodiment, the invention is applied to a lens barrel of an optical type having the first and second lens units arranged to be movable and the position of the iris stationary. However the invention is not limited to this type but is applicable also to some other optical types in which the cam parts of the plate cam are differently arranged to make not only the positions of the first and second lens units variable but the position of the iris also variable. Further, the first and second lens units may be arranged to be driven in the same direction both in the zoom area and in the drawn-in area.

Further, the cam part of the plate cam 16 for the first lens unit may be arranged to be in an R shape to have the fixed pin of the afocal-lens tube located at the center of that shape. By this arrangement, the position of the first lens unit on the optical axis can be arranged to be unvarying within the photo-taking area and variable only in setting the lens barrel at the drawn-in position. By this arrangement a lens barrel drawing-in function is, so to speak, added to the conventional four-unit rear-focus optical system called the front-lens fixed type.

While the invention is applied to a lens barrel adapted to a video camera, the invention is applicable also to optical apparatuses having optical systems of types other than the optical system described above.

According to the above-described arrangement of the first embodiment, a plurality of moving elements can be driven in the direction of the optical axis by a simple structural arrangement composed of only one driving unit and a plate cam without recourse to a helicoid or a cam ring which tends to result in an increase in size (or diameter) of the apparatus.

Further, according to the arrangement of the first embodiment, the first and second moving elements can be driven either in the same direction or in opposite directions in a complex manner by a simple mechanism.

The driving unit is arranged such that a plurality of moving elements are driven within a usage area for photo-taking, etc., by causing the driving unit to act within a first operating area and the plurality of moving elements, particularly the element located nearest to the object side, are driven to a stowing area by causing the driving unit to act within a second operating area. In this manner, the optical apparatus can be arranged to be compact in carrying it.

If a light-quantity adjusting unit is included in the plurality of moving elements, the light-quantity adjusting unit can be more freely allocated, so that the optical system can be compactly designed.

Further, one of the plurality of moving elements is located nearest to the object side among other elements. This moving element is arranged to be urged by a spring force to abut on a cam part of the plate cam from the image side. When an external force is applied to that moving element from the object side, the external force can be prevented from being transmitted to the plate cam and the driving unit as that moving element moves away from the cam part against the urging spring force under such a condition. Then, upon removal of the external force, that moving element can be again caused to abut on the cam part by the urging spring force. The arrangement ensures good optical performance.

Figure 8:
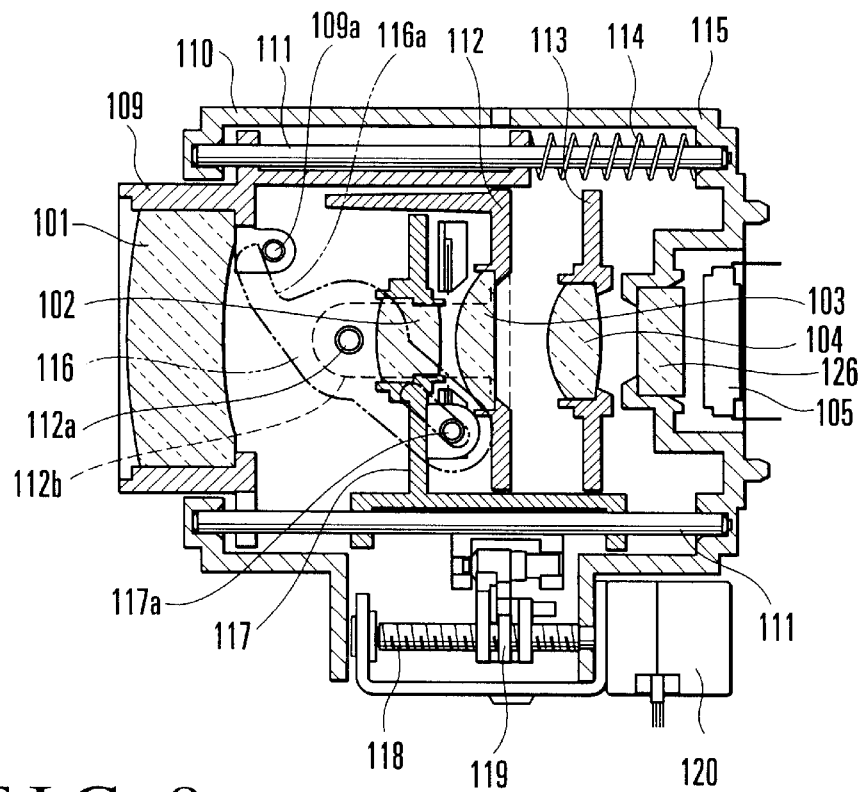
FIG. 8 is a sectional view showing a lens barrel according to a second embodiment of the invention in a state of being at a telephoto end position.
Figure 9:
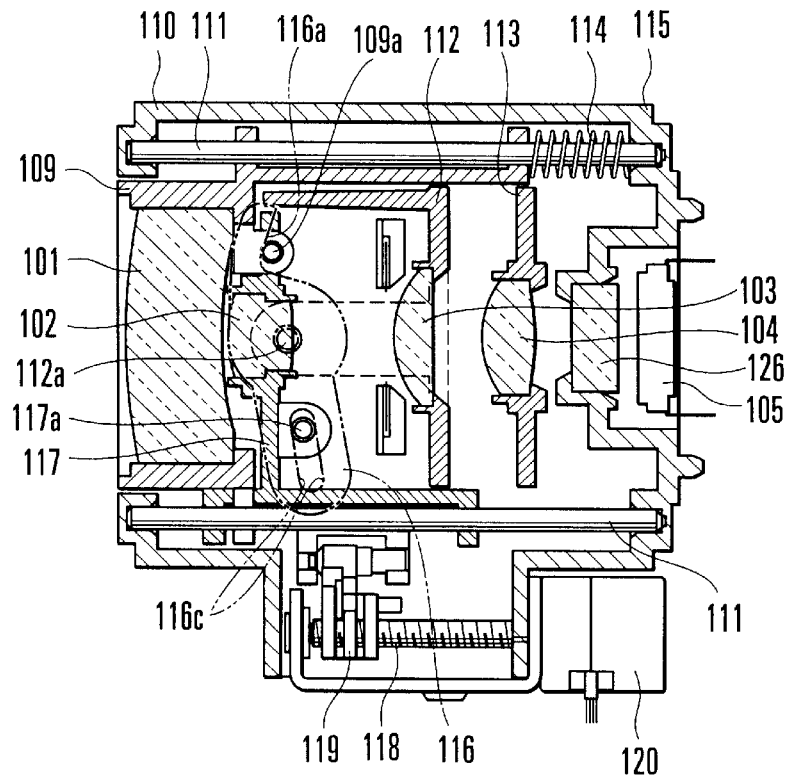
FIG. 9 is a sectional view showing the lens barrel according to the second embodiment in a state of being at a wide-angle end position.
Figure 10:
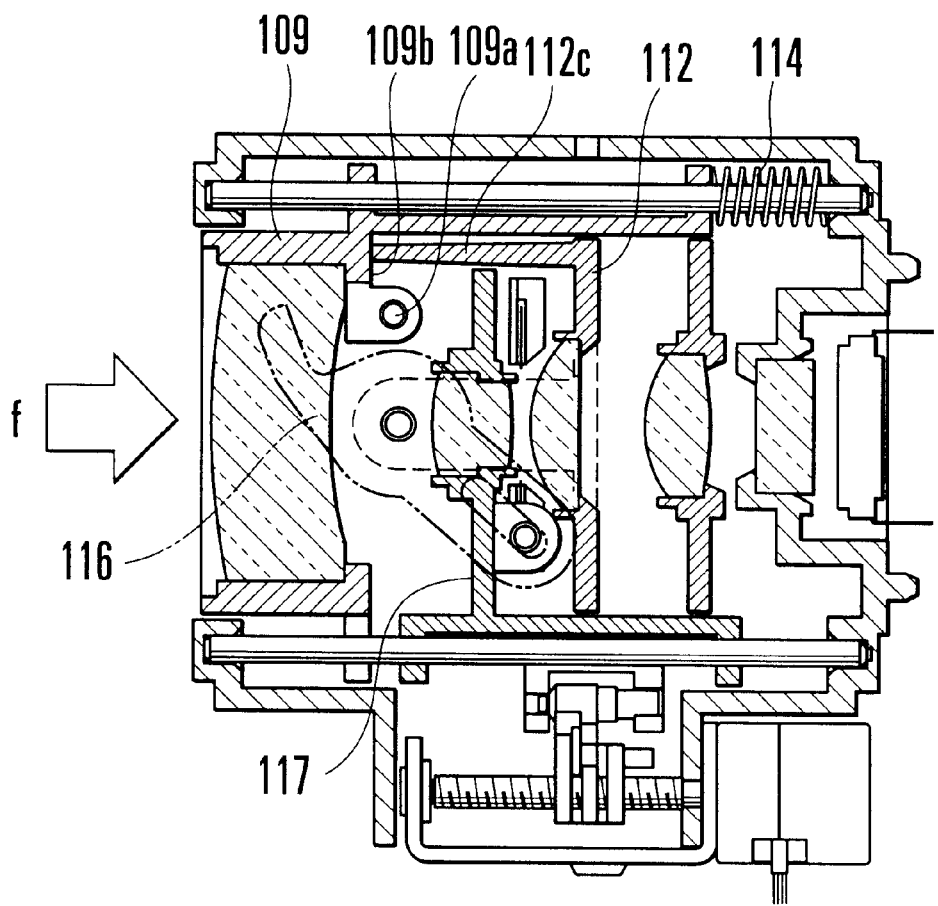
FIG. 10 is a sectional view showing the lens barrel according to the second embodiment in a state of acting when an external force is exerted on the lens barrel.

FIGS. 8 to 10 show a zoom lens barrel which has the lens arrangement shown in FIG. 1, according to a second embodiment of the invention. FIG. 8 shows the zoom lens barrel in a state of being at an optical telephoto position. FIG. 9 shows the zoom lens barrel in a state of being at an optical wide-angle position.

Referring to FIGS. 8 to 10, a stepping motor 120 is employed as a drive source. A lead screw 118 having an external thread formed thereon is the output shaft of the stepping motor 120. A rack 119 having an internal thread formed therein engages the lead screw 118. The rack 119 is mounted on a variator holding frame 117 which holds a variator lens unit 102. When the stepping motor 120 is caused to rotate with driving pulses applied to the stepping motor 120, the lead screw 118 is driven to rotate. Then, the rack 119 receives a driving force from the lead screw 118 in the direction of an optical axis, so that the variator holding frame 117 on which the rack 119 is mounted is driven in the direction of the optical axis.

An afocal-lens-unit holding frame 112 which holds an afocal lens unit 103 is secured to a lens barrel body, which is composed of a front tube 110 and a rear tube 115.

The afocal-lens-unit holding frame 112 has an extension part 112b extending toward the object side in the direction of the optical axis. On the front end of the extension part 112b, there is mounted a cam plate (a rotary member) 116, which is arranged to be rotatable around a shaft 112a toward the optical axis.

A slot 116c is formed in a lower part of the cam plate 116. A cam follower 117a which is provided on the variator holding frame 117 is fitted in the slot 116c of the cam plate 116. When the variator holding frame 117 moves in the direction of the optical axis with respect to the afocal-lens-unit holding frame 112, the cam plate 116 rotates around the shaft 112a according to a distance between the variator holding frame 117 and the afocal-lens-unit holding frame 112. More specifically, when the variator holding frame 117 moves in the direction of parting from the afocal-lens-unit holding frame 112 (toward the object side), the cam plate 116 rotates counterclockwise as viewed in FIGS. 8 and 9 (toward the object side), and when the variator holding frame 117 moves in the direction of approaching the afocal-lens-unit holding frame 112 (toward the image side), the cam plate 116 rotates clockwise as viewed in FIGS. 8 and 9 (toward the image side). An end surface cam 116a is formed on the upper part of the cam plate 116 on the image side.

A front-lens-unit holding frame 109 which holds a front lens unit 101 has a sleeve part extending in the direction of the optical axis. The sleeve part of the front-lens-unit holding frame 109 is slidably fitted on guide bars 111 which are supported on their two ends by the lens barrel body (the front and rear tubes 110 and 115). The front-lens-unit holding frame 109 is thus arranged to be movable in the direction of the optical axis within the lens barrel body (the front and rear tubes 110 and 115).

A spring 114 is disposed around the guide bar 111 between the rear end of the sleeve part of the front-lens-unit holding frame 109 and the rear tube 115. The front-lens-unit holding frame 109 is urged by the urging force of the spring 114 to move toward the object side.

A cam follower 109a is provided on the fore end of an extension part of the front-lens-unit holding frame 109 extending toward the image side. The cam follower 109a abuts on the end surface cam 116a of the cam plate 116 at a part on the object side of the cam plate 116.

Accordingly, when the cam plate 116 rotates clockwise with the variator holding frame 117 moved toward the object side from the position shown in FIG. 8 to the position shown in FIG. 9, the rotating force of the cam plate 116 causes the end surface cam 116a to push the cam follower 109a. Therefore, the front-lens-unit holding frame 109 is driven toward the image side against the urging force of the spring 114. Further, when the cam plate 116 rotates counterclockwise with the variator holding frame 117 moved toward the image side from the position shown in FIG. 9 to the position shown in FIG. 8, the front-lens-unit holding frame 109 is driven toward the object side while being pushed by the urging force of the spring 114 against the end surface cam 116a of the cam plate 116.

In either of these cases, the cam follower 109a of the front-lens-unit holding frame 109 moves along the end surface cam 116a. Therefore, a necessary moving locus of the front-lens-unit holding frame 109 can be obtained by forming the end surface cam 116a in such a shape that causes the moving locus of the front-lens-unit holding frame 109 to be different from that of the variator holding frame 117.

In the second embodiment, the two movable lens units, i.e., the variator holding from 117 and the front-lens-unit holding frame 109, are thus can be driven to have moving loci which differ from each other by using the driving force of the stepping motor 120. Meanwhile, with regard to a focusing-lens-unit holding 113 which holds a focusing lens unit 104, another stepping motor or a DC motor is arranged in combination with a lead screw in such a way as to drive the focusing lens unit 104. By such an arrangement, a lens barrel can be compactly arranged to be short in total length and small in area of projection in the direction of the optical axis.

When the lens barrel is at a telephoto position at which the front-lens-unit holding frame 109 protrudes toward the object side from the lens barrel body (110 and 115), there is a possibility that some external force might happen to be exerted to push the front-lens-unit holding frame 109 into the lens barrel body (110 and 115), as shown in FIG. 10.

Then, in the second embodiment, since only the end surface cam 116a of the cam plate 116 is abutting on cam follower 109a of the front-lens-unit holding frame 109 under this condition, if the external force exerted on the front-lens-unit holding frame 109 is larger than the urging force of the spring 114, the cam follower 109a is allowed to part from the end surface cam 116a. As a result, the front-lens-unit holding frame 109 is caused to move away from the cam plate 116 toward the image side. By this movement, the cam plate 116 and the cam follower 109a can be saved from being damaged by the external force. Therefore, it is not necessary to arrange the cam plate 116 and the cam follower 109a to have increased strengths against such external forces. Therefore, the arrangement of the second embodiment is effective for reduction in size of the cam plate 116 and the cam follower 109a and eventually for reduction in size of the whole lens barrel.

Further, when the front-lens-unit holding frame 109 is pushed inward to a certain extent by the external force, an end surface 109b of the front-lens-unit holding frame 109 comes to abut on the end surface of an extension part 112c of the afocal-lens-unit holding frame 112 extending toward the object side, so that the front-lens-unit holding frame 109 is prevented from being further pushed in.

Upon removal of the external force, the urging force of the spring 114 brings the front-lens-unit holding frame 109 back to its original position where the cam follower 109a abuts on the end surface cam 116a of the cam plate 116.

Figure 11:
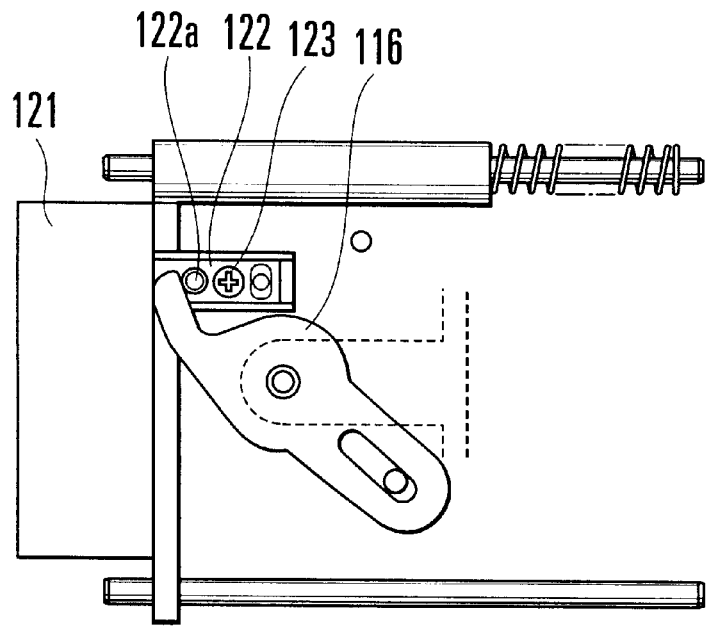
FIG. 11 is a constructional diagram showing a front lens unit and parts therearound in a lens barrel according to a third embodiment of the invention.
Figure 12:
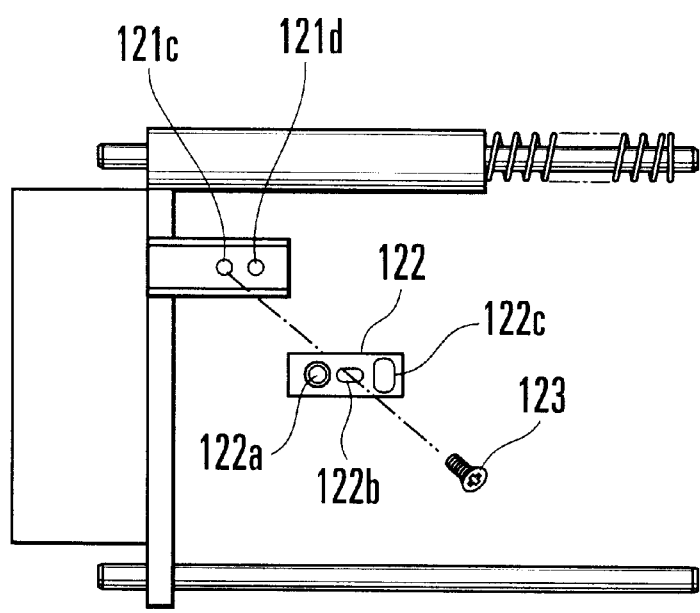
FIG. 12 is an exploded view showing the front lens unit and parts therearound in the third embodiment.

In the second embodiment, the cam follower 109a is arranged integrally with the body of the front-lens-unit holding frame 109. In the case of a lens barrel according to a third embodiment of the invention, a cam follower block 122 which has a cam follower part 122a is mounted at a part of the body of a front-lens-unit holding frame 121 extending toward the image side, as shown in FIGS. 11 and 12. The cam follower block 122 is mounted with a screw 123 in such a way as to have its position adjustable in the direction of the optical axis. Therefore, the position of the cam follower part 122a is arranged to be adjustable in the direction of the optical axis.

More specifically, as shown in FIGS. 11 and 12, a slot 122b is formed in the middle part of the cam follower block 122 to extend in the direction of the optical axis. The cam follower block 122 is mounted on the front-lens-unit holding frame 121 by screwing the screw 123 into a lower hole 121c formed in the extending part of the front-lens-unit holding frame 121 through the slot 122b.

In adjusting the position of the cam follower block 122, the screw 123 is loosened a little, an eccentric tool (not shown) is inserted into an adjustment hole 122c formed in the cam follower block 122, the eccentric tool is positioned by inserting it into a hole 121d which is formed for the eccentric tool in the extending part of the front-lens-unit holding frame 121, and then the position of the cam follower block 122 is adjusted by turning the eccentric tool to slightly move the cam follower block 122 in the direction of the optical axis. The screw 123 is tightened again after completion of the position adjustment.

The front-lens-unit holding frame 121 is thus arranged to permit adjustment of a distance between the front-lens-unit holding frame 121 and the variator holding frame 117 by adjusting the position, in the direction of the optical axis, of the cam follower part 122a of the cam follower block 122 formed separately from the body of the front-lens-unit holding frame 121.

In each of the second and third embodiments described above, the variator holding frame and the front-lens-unit holding frame are arranged in combination with each other to be driven by one and the same motor. However, the invention is not limited to this combination of lens holding frames but is applicable also to some other combinations of lens holding frames.

It is also possible to arrange one of lens holding frames (the variator holding frame in the case of each of the second and third embodiments) to be driven directly by a motor, and to arrange a plurality of other lens holding frames to be driven by the motion of the directly-driven lens holding frame through a rotary member (a cam plate).

Further, in each of the second and third embodiments described above, a rotary member is arranged to be mounted on a lens holding member (the afocal-lens-unit holding frame) which is fixed to the lens barrel body. However, this arrangement may be changed to rotatably mount the rotary member on the lens barrel body.

In each of the second and third embodiments described above, when a variator lens holding member is driven by a drive source (through a lead screw which is driven to rotate by the drive source, for example), the motion of the variator lens holding member causes a rotary member to rotate toward an optical axis and then the front (or leading) lens holding member is driven by the rotary member. By virtue of this arrangement, a plurality of lens holding members can be driven by using only one drive source without recourse to such a complex mechanism that uses a cylindrical cam ring, a helicoid tube having a cam surface formed on its helicoid end surface or the like. Besides, with a part of the rotary member where the leading lens holding member abuts on the rotary member formed in a cam shape, the position of the variator lens holding member and that of the leading lens holding member can be controlled to have moving loci which differ from each other.

Further, an urging means is provided for urging the leading lens holding member toward the object side, and the leading lens holding member is arranged to be allowed to part from the rotary member toward the image side. In a case where an external force happens to be applied to push the lens barrel inward toward the image side, the arrangement effectively prevents any irrational force from being exerted on the rotary member. Upon removal of the external force, the rotary member can be promptly moved back to its original abutting state by the urging force of the urging means.

Further, with the position of a part of the leading lens holding member where the leading lens holding member abuts on the rotary member arranged to be adjustable in the direction of the optical axis, a distance in the direction of the optical axis between the variator lens holding member and the leading lens holding member can be adjusted as desired.

FIGS. 13(a) to 13(c) through FIG. 15 show the arrangement of a lens barrel which has the lens arrangement shown in FIG. 1, according to a fourth embodiment of the invention.

Referring to FIGS. 13(a) to 13(c) through FIG. 15, a first-lens-unit holding member 201 holds a first lens unit L1. The first-lens-unit holding member 201 is held by two guide bars 206a and 206b (see FIG. 14) to be movable in the direction of an optical axis.

A second-lens-unit holding member 202 holds a second lens unit L2. The second-lens-unit holding member 202 is held by two guide bars 207a and 207b (see FIG. 14) in such a way as to be movable in the direction of the optical axis, similarly to the first-lens-unit holding member 201.

A third-lens-unit holding member 203 holds a third lens unit L3. The third-lens-unit holding member 203 is interposed in between a fixed tube 205 and a rear tube 208 which holds a low-pass filter L5, and is fixed in position with screws (not shown).

A CCD sensor (not shown) is mounted on the rear part of the rear tube 208. The CCD sensor converts an optical image formed through the first to fourth lens units L1 to L4 into an electrical signal.

A fourth-lens-unit holding member 204 holds the fourth lens unit L4. The fourth-lens-unit holding member 204 is held by the guide bar 207b, in common with the second-lens-unit holding member 202, and by another guide bar 209 in such a way as to be movable in the direction of the optical axis.

The two ends of each of the guide bars 206a, 206b, 207a and 207b are held by the fixed tube 205 and the rear tube 208. The two ends of the guide bar 209 are held by the third-lens-unit holding member 203 and the rear tube 208. These five guide bars are arranged to guide the first-lens-unit holding member 201, the second-lens-unit holding member 202 and the fourth-lens-unit holding member 204 in the direction of the optical axis and also to prevent them from turning within planes orthogonally intersecting the optical axis.

An IG meter 210 is arranged to drive iris blades 210a with an electromagnetic actuator. The IG meter 210 is fixed to the third-lens-unit holding member 203 with screws (not shown).

A zoom motor 211 is a stepping motor. The driving part and the output screw part of the zoom motor 211 are integrally held by means of a U-shaped sheet metal member. The zoom motor 211 is fixed to the fixed tube 205 with the sheet metal member secured to the fixed tube 205 by means of screws.

A rack 212 is mounted on the first-lens-unit holding member 201. The rack 212 is in mesh with the output screw part of the zoom motor 211. Therefore, when the output screw part of the zoom motor 211 rotates, the first-lens-unit holding member 201 is driven to move in the direction of the optical axis by the intermeshing action of the output screw part and the rack 212.

The rack 212 is urged by a spring 213 to move in the direction of meshing with the output screw part of the zoom motor 211 and in the direction of the optical axis. The urging force of the spring 213 is arranged to eliminate rattling of intermeshing and rattling in the direction of thrust.

Figure 14:
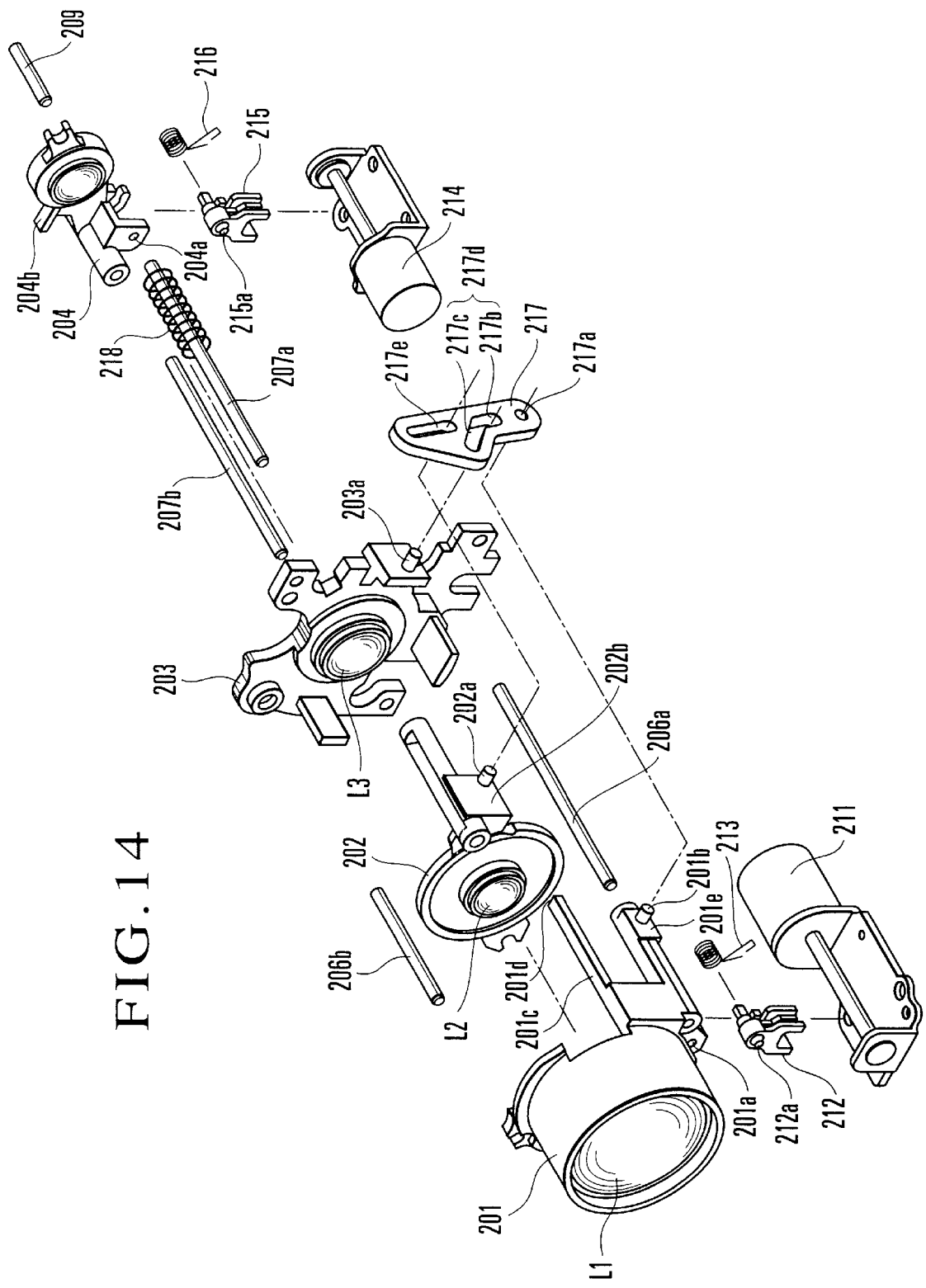
FIG. 14 is an exploded perspective view showing a driving mechanism in the lens barrel shown in FIGS. 13(a) to 13(c).
Figure 15:
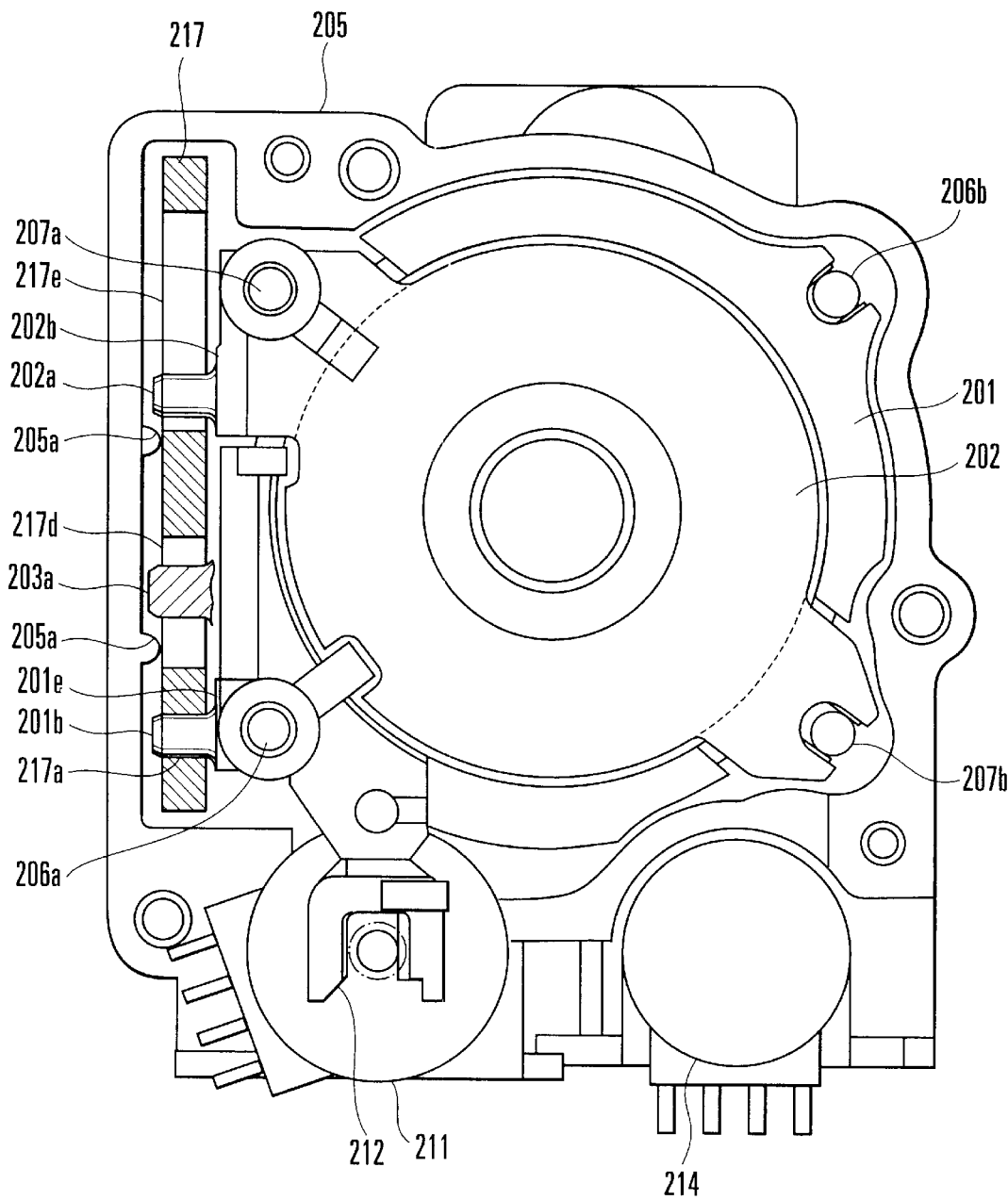
FIG. 15 is a sectional view of the lens barrel shown in FIGS. 13(a) to 13(c) taken on a line A—A shown in FIG. 13(a).

A focus motor 214 shown in FIGS. 14 and 15 is a stepping motor. The focus motor 214 is fixed to the rear tube 208 with screws, similarly to the zoom motor 211.

Similarly to the first-lens-unit holding member 201, the fourth-lens-unit holding member 204 is provided with a rack 215 and a spring 216. The rack 215 is in mesh with the output screw part of the focus motor 214 in such a way as to make no rattling. When the output screw part of the focus motor 214 rotates, the fourth-lens-unit holding member 204 is caused to be driven in the direction of the optical axis by the intermeshing action of the output screw part and the rack 215.

The racks 212 and 215 are mounted by fitting their shaft parts 212a and 215a respectively into hole parts 201a and 204a formed in the first and fourth-lens-unit holding members 201 and 204 to extend in the direction of the optical axis. The racks 212 and 215 are rotatable around their shaft parts 212a and 215a, respectively. Therefore, even if any of the above-stated guide bars deviates in parallelism from the output screw part of the motor 211 or 214, the first and fourth-lens-unit holding members 201 and 204 can be smoothly moved in the direction of the optical axis.

The teeth of the racks 212 and 215 are pressed into contact with the output screw parts of the motors 211 and 214 by the springs 213 and 216, respectively. The teeth of the racks 212 and 215 are thus arranged to be reliably in mesh with the output screw parts of the motors 211 and 214, respectively.

A plate cam 217 is formed by arranging cam slots in a flat plate member. A hole 217a is formed in one end part of the plate cam 217. A pin 201b of the first-lens-unit holding member 201 is fitted into the hole 217b. The plate cam 217 is thus arranged to be rotatably supported by the first-lens-unit holding member 201.

In an intermediate part in the longitudinal direction of the plate cam 217, there are formed a first cam slot part 217b which is in a nearly rectilinear shape extending in the longitudinal direction of the plate cam 217 and a second cam slot part 217c which is also in a nearly rectilinear shape extending from one end of the first cam slot part 217b obliquely with respect to the first cam slot part 217b. The first and second cam slot parts 217b and 217c are thus interconnected at their end parts to jointly form a third-lens-unit engaging cam slot 217d. A fixed pin 203a which is formed integrally with the third-lens-unit holding member 203 is engaging the third-lens-unit engaging cam slot 217d.

Further, another driving cam slot 217e is formed in the other end part of the plate cam 217 in a nearly rectilinear shape which extends in the longitudinal direction of the plate cam 217. A pin 202a which is provided on the second-lens-unit holding member 202 is engaging the driving cam slot 217e.

The plate cam 217 is arranged to be prevented from moving inward in the direction of diameter of the lens barrel by abutting on a slide surface 201e located at the root of the pin 201b of the first-lens-unit holding member 201 and a slide surface 202b located at the root of the pin 202a of the second-lens-unit holding member 202.

Further, as shown in FIG. 15, the movement of the plate cam 217 outward in the direction of diameter of the lens barrel is prevented with the fixed tube 205 mounted on the lens barrel after mounting the plate cam 217. When the plate cam 217 comes to move outward, the plate cam 217 abuts on two projections 205a provided on the inner circumferential side of the fixed tube 205. In rotating or moving in the direction of the optical axis, the plate cam 217 slides over the projections 205a. The projections 205a are arranged to have a sufficient amount of clearance between the projections 205a and the slide surfaces 201e and 202b to ensure a smooth movement of the plate cam 217.

A coiled spring 218 is attached, before the second-lens-unit holding member 202 is mounted, to the guide bar 207a which is inserted into the sleeve of the second-lens-unit holding member 202. The coiled spring 218 is thus arranged to constantly urge the second-lens-unit holding member 202 to move toward the front, i.e., toward the object side. Under the urging force of the coiled spring 218, the pins 201b, 202a and 203a are kept pressed against the front end surfaces of the hole 217a and the cam slots 217d and 217e of the plate cam 217 without any rattling of fitting engagement.

To avoid an increase of load on the zoom motor 211, the spring pressure of the coiled spring 218 is set at such a value that is just enough to lift the second-lens-unit holding member 202 against its own weight, in whatever posture the lens barrel may be, for eliminating the above-stated rattling of fitting engagement.

A light-blocking wall 201c is provided on the first-lens-unit holding member 201. The light-blocking wall 201c is arranged to come in between the light-projecting and light-receiving elements of a photo-interrupter (not shown) which is disposed at a stationary part, such as the fixed tube 205. A control circuit (not shown) can detect the arrival of the first-lens-unit holding member 201 at a predetermined reference position when an end part 201d of the light-blocking wall 201c comes to pass through a space between the light-projecting and light-receiving elements. The absolute positions of the first-lens-unit holding member 201 can be always correctly detected by counting the number of driving pulses applied to the zoom motor 211 after the detection of the arrival of the first-lens-unit holding member 201 at the reference position.

The position of the second-lens-unit holding member 202 is determined in interlocking relation to the position of the first-lens-unit holding member 201 through the plate cam 217, as will be described later. Therefore, the zooming positions of the first and second-lens-unit holding members 201 and 202 and their arrival at drawn-in positions are detectable by detecting only the absolute position of the first-lens-unit holding member 201.

The fourth-lens-unit holding member 204 is also provided with a light-blocking wall 204b which is formed in a manner similar to that of the first-lens-unit holding member 201. Therefore, the arrival at a reference position of the fourth-lens-unit holding member 204 can be likewise detected through a photo-interrupter. Then, after the detection of the arrival, the absolute position of the fourth-lens-unit holding member 204 is detectable by counting the number of driving pulses applied to the focus motor 214.

Figure 13A:
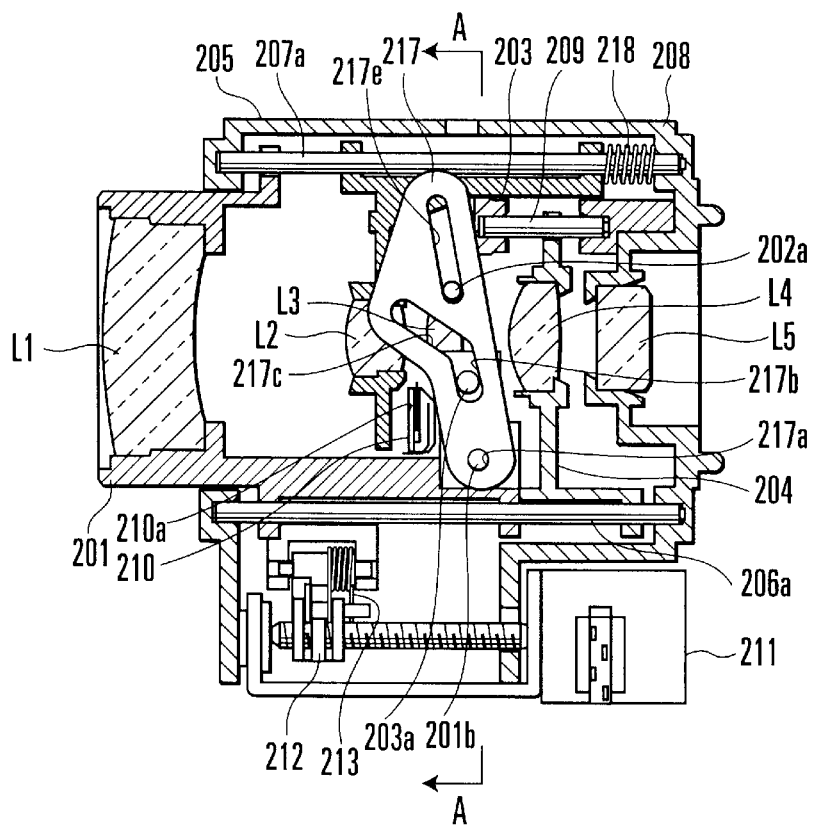
FIGS. 13(a) to 13(c) are sectional views showing a lens barrel according to a fourth embodiment of the invention.
Figure 13B:
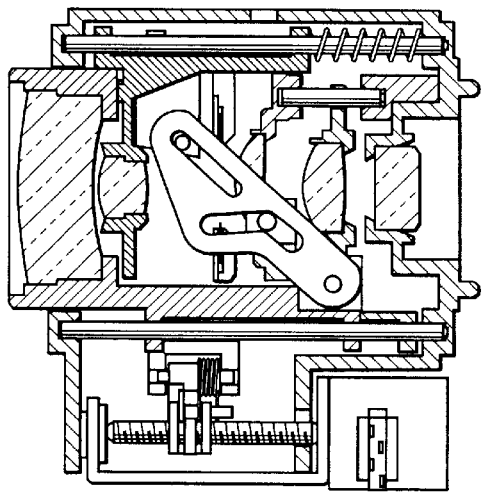
Figure 13C:
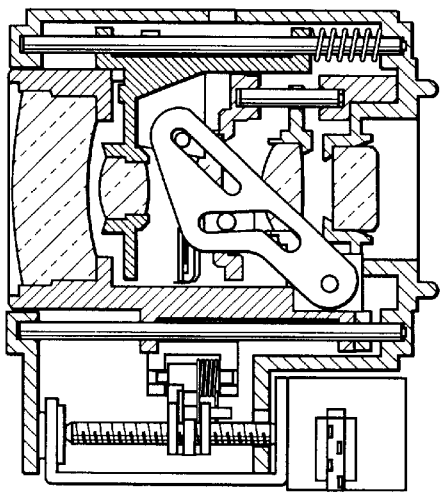

The operation of the lens barrel according to the fourth embodiment of the invention is next described with reference to FIGS. 13(a) to 13(c). The lens barrel is shown in a state of being at a telephoto end position in FIG. 13(a), in a state of being at a wide-angle end position in FIG. 13(b), and in a state of being at a drawn-in position in FIG. 13(c).

With the lens barrel at a position between the telephoto end position and the wide-angle end position, when the zoom motor 211 is driven for zooming to cause the first-lens-unit holding member 201 to rectilinearly move in the direction of the optical axis, the plate cam 217, which has the pin 201b fitted in the hole 217a, tries to move in the direction of the optical axis together with the first-lens-unit holding member 201. However, since the fixed pin 203a of the third-lens-unit holding member 203 is engaging the first cam slot part 217b of the third-lens-unit engaging cam slot 217d at this time, the plate cam 217 rotates around the pin 201b, according to the movement of the first-lens-unit holding member 201 in the direction of the optical axis, while moving in the direction of the optical axis together with the first-lens-unit holding member 201.

The rotation of the plate cam 217 causes the pin 202a of the second-lens-unit holding member 202 to engage the driving cam slot 217e of the plate cam 217. By this engagement, the rotating force of the plate cam 217 is converted into a driving force in the direction of the optical axis. This driving force is transmitted to the second-lens-unit holding member 202 to cause the second-lens-unit holding member 202 to be driven in the direction of the optical axis in association with the movement of the first-lens-unit holding member 201.

The first and second-lens-unit holding members 201 and 202 are driven to have their positional relation kept unvarying by the positions and the shapes of the cam slots formed in the plate cam 217. Further, in the fourth embodiment, the directions in which the first and second-lens-unit holding members 201 and 202 are driven are in a relation as shown in FIG. 1. In other words, when the first-lens-unit holding member 201, i.e., the first lens unit L1, is driven in one direction of the optical axis, the second-lens-unit holding member 202, i.e., the second lens unit L2, is driven in the opposite direction of the optical axis.

Next, with the lens barrel in a state of being between the wide-angle end position and the drawn-in position, when the zoom motor 211 is driven to move the first-lens-unit holding member 201 in the direction of the optical axis for moving either to the drawn-in position or to the wide-angle end position, the plate cam 217, which has the pin 201b of the first-lens-unit holding member 201 engaging the hole 217b, tries to move in the direction of the optical axis together with the first-lens-unit holding member 201.

Then, the fixed pin 203a of the third-lens-unit holding member 203, which has been engaging the first cam slot part 217b of the third-lens-unit-engaging cam slot 217d in the case of photo-taking by zooming, comes to engage the second cam slot part 217c by passing over a junction point between the first and second cam slot parts 217b and 217c in a case where the first-lens-unit holding member 201 is at a position located closer to the image side than the wide-angle end position, i.e., between the drawn-in position and the wide-angle end position.

In this state, the second cam slot part 217c is approximately in parallel with the optical axis because of the relation of the rotating position of the plate cam 217 to the longitudinal direction of the second cam slot part 217c. Therefore, when the first-lens-unit holding member 201 moves in the direction of the optical axis, the engagement of the driving cam slot 217e of the plate cam 217 with the pin 202a of the second-lens-unit holding member 202 causes the second-lens-unit holding member 202 to move in the direction of the optical axis together with the plate cam 217. In other words, the first and second-lens-unit holding members 201 and 202 come to move together in the direction of the optical axis. The first and second-lens-unit holding members 201 and 202 are thus driven together in the direction of the optical axis in a state of having a distance between them kept unvarying.

In short, in the case of the fourth embodiment, the first and second-lens-unit holding members 201 and 202 are drawn out together toward the object side in driving the lens barrel from the drawn-in position to the wide-angle end position. Upon arrival at the wide-angle end position, the fixed pin 203a passes the junction point between the first and second cam slot parts 217b and 217c. Then, when zooming is performed toward the telephoto end after the junction point, the first-lens-unit holding member 201 moves toward the object side while the second-lens-unit holding member 202 moves in the direction of moving away from the first-lens-unit holding member 201, i.e., toward the image side.

According to the arrangement of the fourth embodiment, the two lens-unit holding members 201 and 202 can be driven with one zoom motor 211 by just adding one plate cam 217 (and may be another plate cam across the optical axis) to the lens barrel. Besides, when the first-lens-unit holding member 201 is driven, for example, from the telephoto end position to the drawn-in position toward the image side, the second-lens-unit holding member 202 can be caused to move also toward the image side after the second-lens-unit holding member 202 is first temporarily moved toward the object side. The use of the plate cam thus permits driving in the same complex manner as in the case of using a cam tube. The arrangement permits reduction in total length of the lens barrel.

Further, compared with a lens barrel using a cam tube or a helicoid tube, the arrangement of the fourth embodiment not only permits reduction in size but also lessens a loaded torque of the motor 211, so that power consumption can be lessened. Further, since the lens barrel can be assembled by just adding the plate cam 217, the fourth embodiment can be easily assembled at low cost.

In the fourth embodiment, stepping motors are employed as the zoom motor 211 and the focus motor 214. However, in accordance with the invention, the use of stepping motors may be changed to use some other drive sources, such as DC motors, linear actuators, etc.

The fourth embodiment is arranged to use optical detecting means for detecting lens positions. However, this arrangement may be changed to use detecting means of some other type, such as magnetic or variable-resistance type detecting means.

In the case of the fourth embodiment, the invention is applied to a zoom lens adapted for a video camera. However, the invention is applicable also to the lens barrels of other optical apparatuses, such as a still camera, etc.

As mentioned above, according to the invention, a compact lens barrel can be simply arranged to drive two lens units with one drive source by using a cam plate, or a plate cam, instead of using a helicoid or a tubular cam ring. Besides, the length of the lens barrel according to the invention can be shortened when it is not in use.

Further, the use of a cam plate according to the invention can be arranged such that, when the first-lens-unit holding member is driven, for example, within a first area (a zooming area, for example), the second-lens-unit holding member is driven to move in the direction reverse to the moving direction of the first-lens-unit holding member, and when the first-lens-unit holding member is driven within a second area (a drawn-in area, for example), the second-lens-unit holding member is driven to move in the same direction as the first-lens-unit holding member.

What is claimed is:

1. An optical apparatus having at least a first optical unit and a second optical unit which move in an optical axis direction, said optical apparatus comprising:

a first unit holding member holding said first optical unit;

a second unit holding member holding said second optical unit;

a driven member arranged to be driven to move in the optical axis direction; and a cam member of a plate-like shape having a cam part, said cam member being driven to a first state in which said cam member rotates around a predetermined axis and to a second state in which said cam member moves in said optical axis direction without a further rotation around the axis, in accordance with driven motion of said driven member driven in said optical axis direction, wherein when said cam member is driven to the first and second states, said cam member moves said first unit holding member and said second unit holding member in said optical axis direction.

2. An optical apparatus according to claim 1, further comprising a first guide member arranged to guide said first unit holding member in the optical axis direction, a first urging member arranged to urge said first unit holding member to move toward an object side, a second guide member arranged to guide said second unit holding member in the optical axis direction, and a second urging member arranged to urge said second unit holding member to move toward the object side.

3. An optical apparatus according to claim 2, wherein said cam member is a cam lever having a first end surface cam part and a second end surface cam part, said first unit holding member engaging said first end surface cam part against an urging force of said first urging member, and said second unit holding member engaging said second end surface cam part against an urging force of said second urging member.

4. An optical apparatus according to claim 1, wherein said cam member is provided with a long slot and a curved slot which branches from said long slot, and at least one of two pin members extending from a fixed member is fitted into said long slot.

5. An optical apparatus according to claim 4, wherein, in a state where the other of said two pin members is also fitted into said long slot, said cam member moves in the optical axis direction along said long slot, and, in a state where the other of said two pin members is fitted into said curved slot, said cam member rotates.

6. An optical apparatus according to claim 5, wherein, in the state where the other of said two pin members is fitted into said curved slot, said cam member rotates to drive said first unit holding member and said second unit holding member in the optical axis direction so as to effect a zooming function.

7. An optical apparatus according to claim 6, wherein, in the state where the other of said two pin members is also fitted into said long slot, said cam member moves in the optical axis direction along said long slot to cause said first unit holding member and said second unit holding member to move in the optical axis direction in such a way as to bring said optical apparatus into a standby state for a photo-taking operation.

8. An optical apparatus according to claim 1, wherein said driven member and said first unit holding member move integrally with each other in the optical axis direction, and said cam member is pivotally supported by said first unit holding member.

9. An optical apparatus according to claim 8, wherein said cam member is provided with a first long slot, and a pin provided on said second unit holding member is fitted into said first long slot.

10. An optical apparatus according to claim 9, wherein said cam member is further provided with a second long slot, and a pin provided on a fixed member is fitted into said second long slot.

11. An optical apparatus according to claim 10, wherein said second long slot has two rectilinear portions.

12. An optical apparatus according to claim 1, wherein said first unit holding member holds a lens unit located at a position closest to an object side.

13. An optical apparatus according to claim 1, wherein said optical apparatus is a lens barrel.

14. An optical apparatus having at least a first optical unit and a second optical unit which move in an optical axis direction, said optical apparatus comprising:

a first unit holding member holding said first optical unit;

a second unit holding member holding said second optical unit;

a first guide member arranged to guide said first unit holding member in the optical axis direction;

a second guide member arranged to guide said second unit holding member in the optical axis direction;

an urging member arranged to urge said first unit holding member to move toward an object side, a driving unit driving said second unit holding member in said optical axis direction, wherein said second unit holding member has a driven part directly driven by said driving unit; and a cam member of a plate-like shape having a first cam part and a second cam part, said cam member being arranged to rotate around a predetermined axis, wherein said first cam part engages said first unit holding member against an urging force of said urging member, and said second cam part engages said second unit holding member, and wherein said first unit holding member is moved in the optical axis direction, in accordance with rotation of said cam member around said predetermined axis rotated by movement in the optical axis direction of said second unit holding member.

15. An optical apparatus according to claim 14, wherein said second cam part is a long slot, said long slot engaging a pin provided on said second unit holding member.

16. An optical apparatus according to claim 14, wherein said driving unit includes an axial member which longitudinally extends in the optical axis direction and is provided with a helical groove, and a motor member arranged to drive said axial member to rotate, and said driven part of said second unit holding member is driven in the optical axis direction alone said helical groove according to said axial member being rotated.

17. An optical apparatus according to claim 14, wherein said first optical unit is a lens unit located at a position closest to the object side.

18. An optical apparatus having at least a first optical unit and a second optical unit which move in an optical axis direction, said optical apparatus comprising:

a first unit holding member holding said first optical unit;

a second unit holding member holding said second optical unit;

a cam member of a plate-like shape having a cam part; and a driving unit driving said cam member, wherein said cam member has a driven part directly driven by said driving unit, said cam member being driven by said driving unit the first state in which said cam member rotates around a predetermined axis and to a second state in which said cam member moves in said optical axis direction without a further rotation around the axis, wherein when said cam member is driven to the first and second states, said cam member moves said first unit holding member and said second unit holding member in said optical axis direction.

* * * * *

UNITED STATES PATENT AND TRADEMARK OFFICE
CERTIFICATE OF CORRECTION

PATENT NO. : 6,553,185 B1
DATED : April 22, 2003
INVENTOR(S) : Hiroyoshi Inaba et al.

Figure 6A:
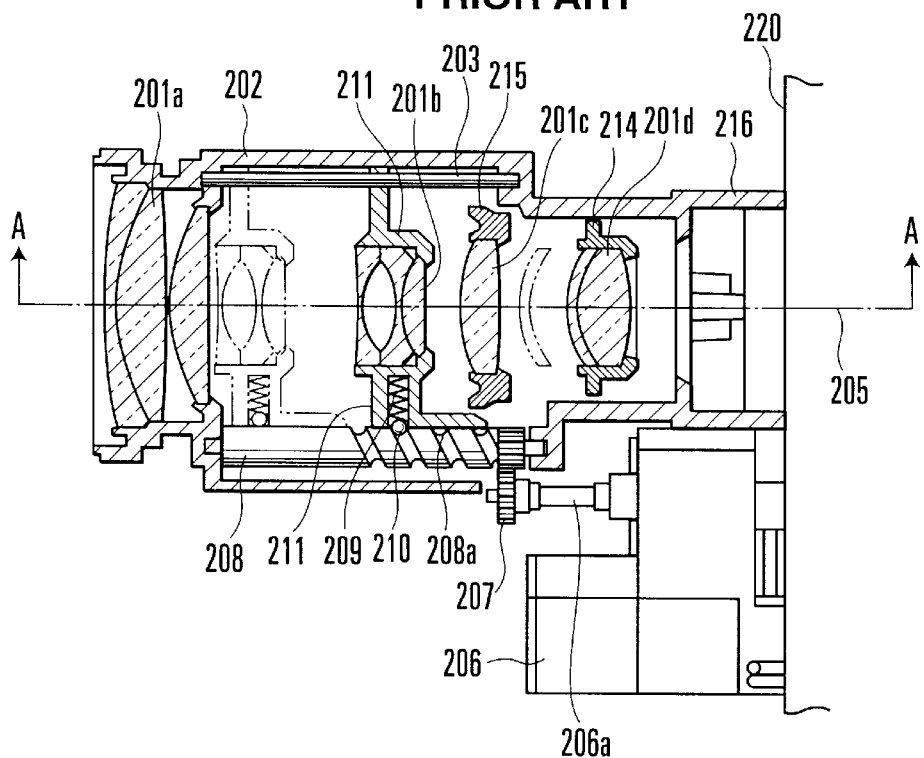
FIGS. 6(a) and 6(a) are sectional views showing a conventional lens barrel.
Figure 6B:
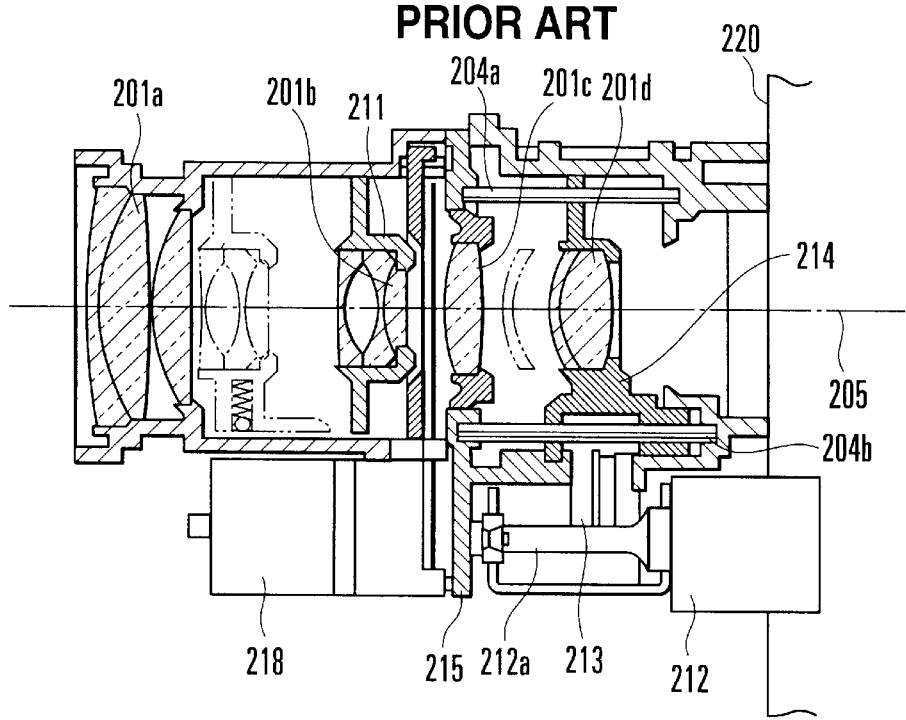
Figure 7:
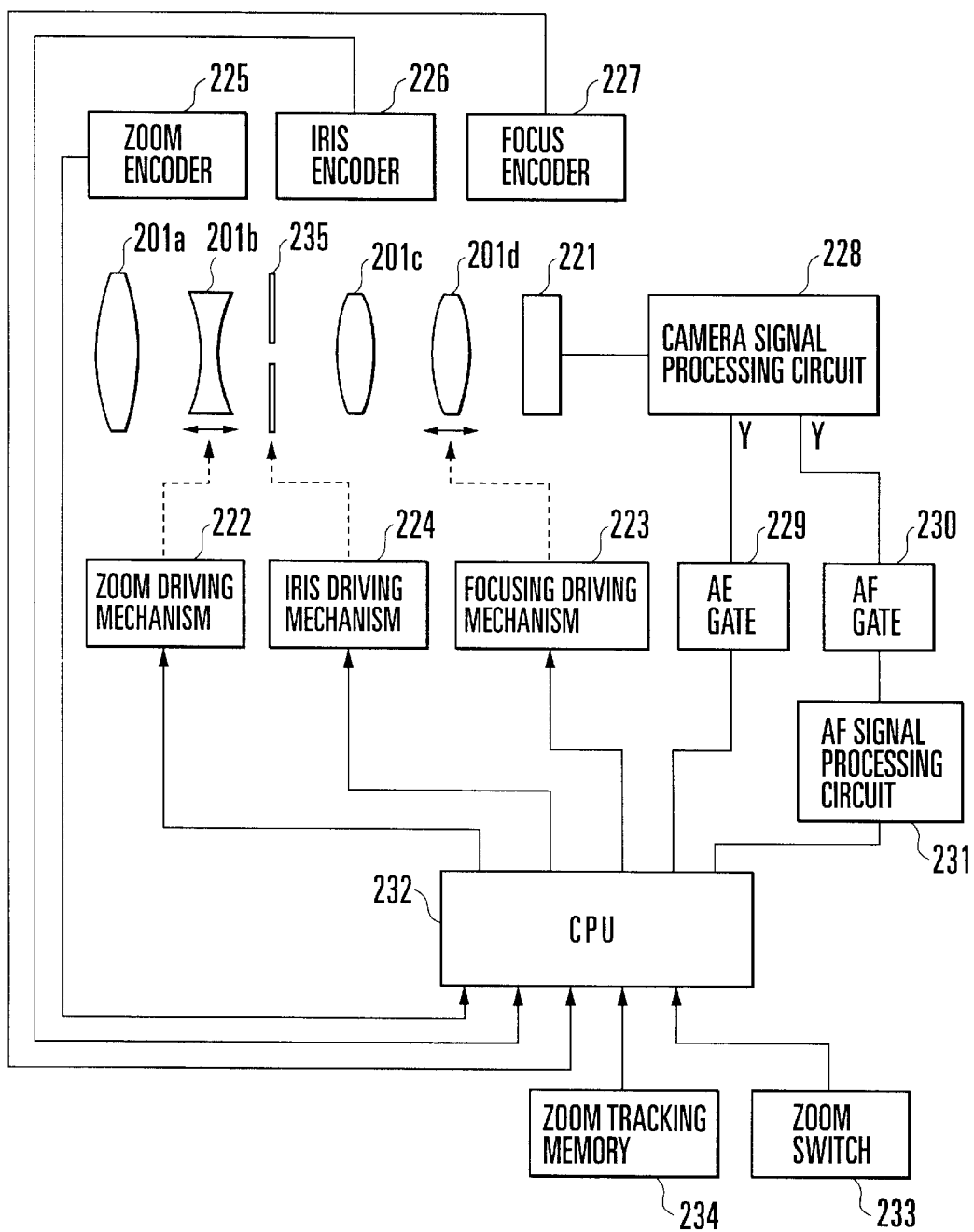
FIG. 7 is a block diagram showing the arrangement of a control circuit in the conventional lens barrel.

It is certified that error appears in the above-identified patent and that said Letters Patent is hereby corrected as shown below:

Column 2,
Lines 25, 26 and 43-44, delete "FIGS. 6(a) and 6(a)" and insert
-- FIGS. 6(a) and 6(b) --.

Column 3,
Line 22, delete "and-to" and insert -- and to --.

Column 6,
Line 9, delete "FIGS. 6(a) and 6(a)" and insert -- FIGS. 6(a) and 6(b) --.

Column 11,
Lines 10 and 12, delete "4a" and insert -- 4b --.

Signed and Sealed this

Twenty-third Day of March, 2004

JON W. DUDAS
*Acting Director of the United States Patent and Trademark Office*